US009965757B2

(12) United States Patent
Bhinder

(10) Patent No.: US 9,965,757 B2
(45) Date of Patent: May 8, 2018

(54) METHOD AND SYSTEM FOR CONTROLLING ACCESS TO A FINANCIAL ACCOUNT

(75) Inventor: Mick M. Bhinder, Richmond Hill (CA)

(73) Assignee: |Am| Authentications Inc., Richmond Hill (CA)

( * ) Notice: Subject to any disclaimer, the term of this patent is extended or adjusted under 35 U.S.C. 154(b) by 239 days.

(21) Appl. No.: 13/097,255

(22) Filed: Apr. 29, 2011

(65) Prior Publication Data

US 2011/0302083 A1 Dec. 8, 2011

(30) Foreign Application Priority Data

Jun. 7, 2010 (CA) ..................................... 2704864

(51) Int. Cl.
G06Q 40/00 (2012.01)
G06Q 20/32 (2012.01)
G06Q 20/40 (2012.01)

(52) U.S. Cl.
CPC ......... *G06Q 20/3221* (2013.01); *G06Q 20/32* (2013.01); *G06Q 20/3223* (2013.01); *G06Q 20/40* (2013.01)

(58) Field of Classification Search
CPC .... G06Q 20/40; G06Q 20/4016; G06Q 40/02; G06Q 20/3221; G06Q 20/32; G06Q 20/3223

(Continued)

(56) References Cited

U.S. PATENT DOCUMENTS 5,859,419 A * 1/1999 Wynn ........................... 235/487
6,012,144 A 1/2000 Pickett (Continued)

FOREIGN PATENT DOCUMENTS

CN 101527070 A 9/2009
EP 1463011 A2 9/2004

(Continued)

OTHER PUBLICATIONS

Mohammed Alzomai et al., An exprimental investigation of the usability of transaction authorization in online bank security systems, ACM International Conference Proceeding Series; vol. 328, Proceedings of the sixth Australasian conference on information security—vol. 81, Publisher: Australian Computer Society, Inc., Wollongong, NSW, Australia, 2008, pages 65-73.

(Continued)

*Primary Examiner* — Rajesh Khattar
(74) *Attorney, Agent, or Firm* — Bereskin & Parr LLP/S.E.N.C.R.L., s.r.l.

(57) ABSTRACT

A computer implemented system and method for controlling access to a financial account, the system comprising: one or more memories for storing information and at least one set of instructions, and one or more processors for receiving the financial account information at an access terminal, wherein the access terminal collects access data; identifying a destination account from the financial account information; sending an authorization request to a mobile device linked to the destination account, wherein the authorization request comprises a variable amount of the access data; receiving a response to the authorization request from the mobile device; and controlling access to the financial account at the access terminal based on the response. In some embodiments, the system and method may be further configured to store the response in the destination account. In other embodiments, the financial account is used for payment in a sales transaction, and the access is a request for payment from the financial account.

33 Claims, 17 Drawing Sheets

(58) Field of Classification Search
USPC .................................................. 705/35–45
See application file for complete search history.

(56) References Cited

U.S. PATENT DOCUMENTS

| | | | |
|---|---|---|---|
| 7,014,107 | B2 | 3/2006 | Singer et al. |
| 7,357,310 | B2 | 4/2008 | Calabrese et al. |
| 7,379,920 | B2 | 5/2008 | Leung et al. |
| 7,533,047 | B2 | 5/2009 | Hagale et al. |
| 7,600,676 | B1 | 10/2009 | Rados et al. |
| 7,729,984 | B1* | 6/2010 | Nappi .............................. 705/39 |
| 2002/0082995 | A1 | 6/2002 | Christie, IV |
| 2002/0143686 | A1* | 10/2002 | Greene et al. ................... 705/37 |
| 2003/0229561 | A1* | 12/2003 | Wallman ......................... 705/36 |
| 2004/0019564 | A1 | 1/2004 | Goldthwaite et al. |
| 2006/0095369 | A1 | 5/2006 | Hofi |
| 2006/0131390 | A1 | 6/2006 | Kim |
| 2007/0011099 | A1 | 1/2007 | Sheehan |
| 2007/0094150 | A1 | 4/2007 | Yuen et al. |
| 2007/0143230 | A1 | 6/2007 | Narainsamy et al. |
| 2007/0175978 | A1 | 8/2007 | Stambaugh |
| 2007/0262136 | A1 | 11/2007 | Ou |
| 2008/0052292 | A1* | 2/2008 | Hallowell et al. ................ 707/9 |
| 2008/0091544 | A1 | 4/2008 | Linlor |
| 2008/0114699 | A1 | 5/2008 | Yuan et al. |
| 2009/0083160 | A1 | 3/2009 | Hagale et al. |
| 2009/0089190 | A1* | 4/2009 | Girulat, Jr. ...................... 705/30 |
| 2009/0138366 | A1 | 5/2009 | Bemmel et al. |
| 2009/0254479 | A1 | 10/2009 | Pharris |
| 2009/0287599 | A1 | 11/2009 | Lamar, III et al. |
| 2009/0319425 | A1* | 12/2009 | Tumminaro et al. ........... 705/42 |
| 2010/0017325 | A1 | 1/2010 | Scherpa et al. |
| 2010/0057623 | A1 | 3/2010 | Kapur et al. |
| 2010/0106649 | A1 | 4/2010 | Annan |
| 2010/0121767 | A1 | 5/2010 | Coulter et al. |
| 2010/0125737 | A1 | 5/2010 | Kang |
| 2010/0241564 | A1* | 9/2010 | Miller et al. .................... 705/43 |
| 2011/0173122 | A1* | 7/2011 | Singhal ........................... 705/44 |

FOREIGN PATENT DOCUMENTS

| | | |
|---|---|---|
| GB | 2393806 A | 4/2004 |
| GB | 2396472 A | 6/2004 |
| TW | 258969 | 7/2006 |
| WO | 03083793 A2 | 10/2003 |
| WO | 2005001670 A2 | 1/2005 |
| WO | 2006000021 A1 | 1/2006 |
| WO | 2006099294 A1 | 9/2006 |
| WO | 2007079595 A1 | 7/2007 |
| WO | 2008014554 A1 | 2/2008 |
| WO | 2008037062 A1 | 4/2008 |
| WO | 2009057160 A2 | 5/2009 |
| WO | 2009144010 A1 | 12/2009 |

OTHER PUBLICATIONS

Chao-Wen Chan and Chih-Hao Lin, A New Credit Card Payment Scheme Using Mobile Phones Based on Visual Cryptography, Lecture Notes in Computer Science, Intelligence and Security Informatics, Springer Berlin / Heidelberg, vol. 5075/2010, 2010, pp. 467-476.

Andrea Bottoni and Ginaluca Dini, Improving authentication of remote card transactions with mobile personal trusted devices, Computer Communications, vol. 30, Issue 8, Jun. 8, 2007, pp. 1697-1712

Pankaj Batra, Safer Online Transactions in India, May 7, 2009, webpages from http://www.pankajbatra.com/india/safer-credit-debit-card-online-transaction-india-rbi/.

Iulia Ion and Boris Dragovic, Don't trust POS terminals! Verify in-shop payments with your phone, Pervasive 2008, Sydney, Australia, SPMU'08—Workshop on Security and Privacy Issues in Mobile Phone Use, May 19, 2008 http://pervasive2008.org/Papers/Workshop/w1-01.pdf.

Mich E. Kabay, Security Strategies Alert—Two-factor credit-card safety for online transactions, Protecting against credit-card fraud online, Network World, February 21, 2008, http://www.networkworld.com/newsletters/sec/2008/0218sec2.html.

CyberSource Corporation Brochure, Electronic Payments Credit Card Fraud Detection Verification & Compliance for Web, Phone, POS, 2002, http://web-group.comlCyberSource_brochure.pdf.

Dan Butcher, Visa tests SMS transaction alerts, Mobile Marketer newsletter, Aug. 20, 2008, http://www.mobilemarketer.com/cms/news/banking-payments/1565.html.

Credit Card Authorization.com, Information on Merchant Credit Card Accounts, 2001-2008, http://creditcardauthorization.com/.

PayPal, retrieved from Internet Archive's WayBack Machine on Feb. 7, 2010, Jul. 19, 2008, www.paypal.com.

International Search Report and the Written Opinion, PCT/CA2011/000658, dated Aug. 22, 2011.

Canadian Office Action, Canadian patent application No. 2,704,864, dated Feb. 14, 2011.

Canadian Office Action, Canadian patent application No. 2,704,864, dated Jan. 3, 2012.

Canadian Office Action Response dated Apr. 3, 2012 for Canadian Patent Application No. 2,704,864.

Canadian Office Action dated Nov. 14, 2012 for Canadian Patent Application No. 2,704,864.

Canadian Office Action Response dated Feb. 14, 2013 for Canadian Patent Application No. 2,704,864.

International Preliminary Report on Patentability dated Dec. 20, 2012 for International Patent Application No. PCT/CA2011/000658.

Canadian Office Action Response. Canadian Patent Application No. 2,704,864. dated Aug. 15, 2011.

Office Action. Canadian Patent Application No. 2,704,864. dated Jul. 2, 2013.

* cited by examiner

METHOD AND SYSTEM FOR CONTROLLING ACCESS TO A FINANCIAL ACCOUNT

CROSS REFERENCES TO RELATED APPLICATIONS

This application claims the benefit of Canadian patent application no. 2,704,864, filed on Jun. 7, 2010, which is incorporated herein by reference.

FIELD

The embodiments described herein relate to a method and system for financial account security and more particularly a method and system for controlling access to a financial account.

BACKGROUND

In financial transactions involving a payment card (e.g., a credit card), purchaser authorization is typically provided via the same channel through which the account number is provided. For example, this may be in the form of a PIN or a signature at a point-of-sale terminal. Even in technologies that allow for a greater amount of security, i.e., where the payment processing network separately initiates a purchaser authorization exchange (e.g., Verified by Visa®, or MasterCard® SecureCode), purchaser authorization is also provided via the same channel through which the account number is provided (i.e., an internet browser).

SUMMARY OF THE INVENTION

It is advantageous to provide a mechanism for purchaser authorization that does not use the same channel through which an account number is provided; i.e. an independent channel such as a mobile device. Separating the two channels may be particularly advantageous for the detection and prevention of fraudulent transactions. If the account number and authorization details of a payment card have been compromised, a fraudster still cannot execute a financial transaction without approval from the alternate (external) channel. When a fraudulent transaction takes place, the account holder may be immediately notified that fraudulent activity is occurring and may be able to act to deny the transaction before any losses are incurred.

When viewing an authorization request via this separate channel, it may be particularly advantageous if transactional data is provided along with the authorization request so that proper context may be given to the decision maker to approve or decline a transaction, or to freeze the account from where the funds are coming from, thus rendering the account locked from further activities.

The embodiments described herein provide in one aspect, a computer implemented system for controlling access to a financial account, the system comprising:
one or more memories for storing information and at least one set of instructions, and
one or more processors for:
  (a) receiving the financial account information at an access terminal, wherein the access terminal collects access data;
  (b) identifying a destination account from the financial account information;
  (c) sending an authorization request to a mobile device linked to the destination account, wherein the authorization request comprises a variable amount of the access data;
  (d) receiving a response to the authorization request from the mobile device; and
  (e) controlling access to the financial account at the access terminal based on the response.

The embodiments described herein provide in another aspect, a system for controlling access to a financial account, the system comprising:
  (a) an account identification module comprising a processor and a memory containing instructions for:
    i) receiving financial account information and access data from an access terminal, and
    ii) identifying a destination account from the financial account information;
  (b) an authorization relay module comprising a processor and a memory containing instructions for:
    i) sending an authorization request to a mobile device linked to the destination account, wherein the authorization request comprises a variable amount of the access data;
    ii) receiving a response to the authorization request from the mobile device; and
    iii) relaying the authorization to an access processing network, wherein the access processing network is operable to control access to the financial account at the access terminal based on the response.

The embodiments described herein provide in a further aspect, a computer implemented system for controlling access to a financial account, the system comprising:
one or more memories for storing information and at least one set of instructions, and
one or more processors for:
  (a) receiving, from a mobile device, an identifier for identifying a destination account, the destination account being associated with the financial account;
  (b) receiving, from the mobile device, location information of the mobile device;
  (c) identifying at least one access terminal from the location information;
  (d) sending a message to the mobile device, the message comprising:
    an incentive for executing a transaction at the at least one access terminal, and
    an authorization request;
  (e) receiving an identifier for the financial account, the financial account being used in a transaction at the at least one access terminal;
  (f) receiving a response to the authorization request; and
  (g) controlling access to the financial account based on the response to the authorization request.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

DESCRIPTION OF EXEMPLARY EMBODIMENTS

Figure 1:
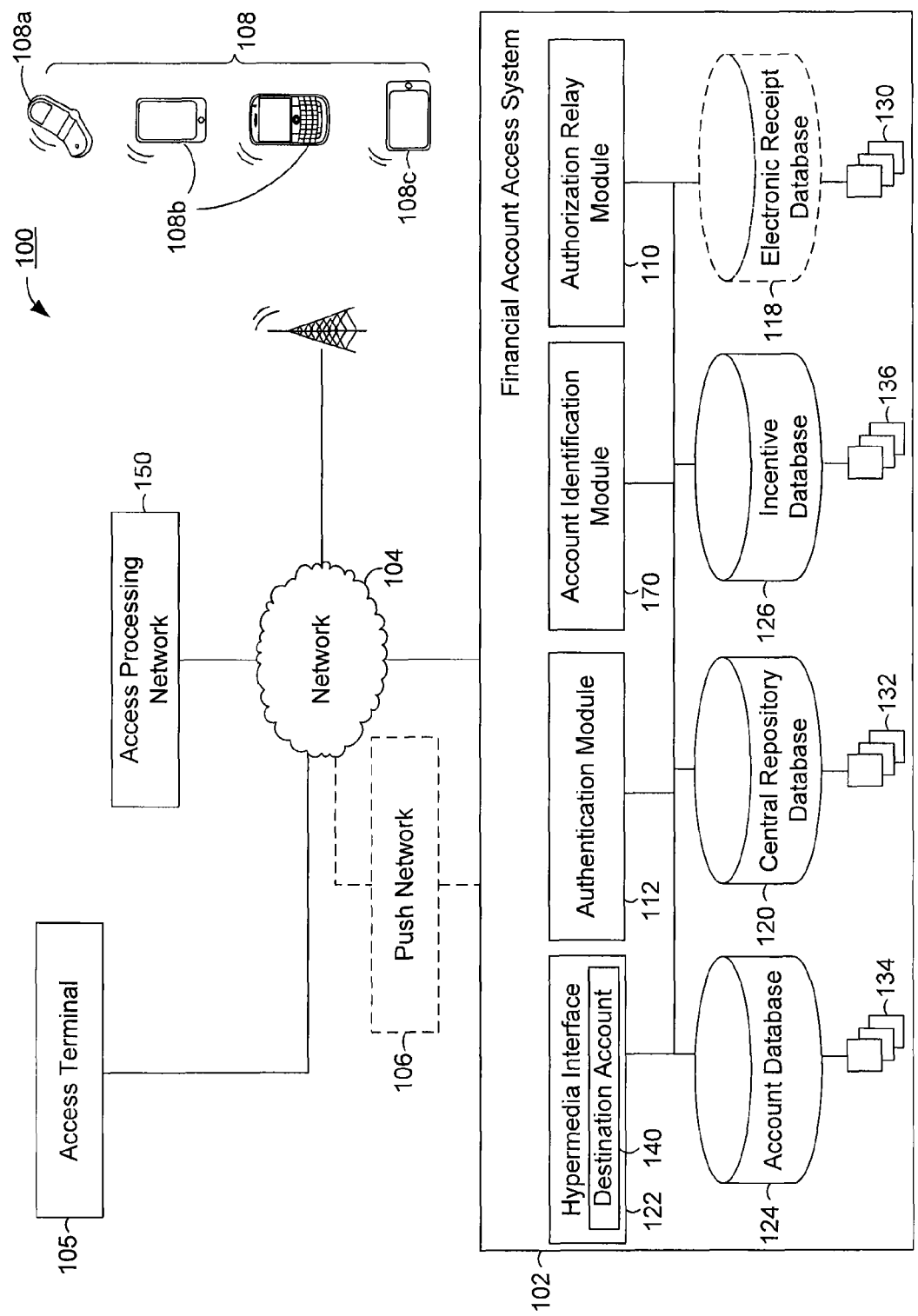
FIG. 1 is a block diagram of a system for controlling access to a financial account.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a personal computer, laptop, personal data assistant, cellular telephone, smart-phone device and wireless hypermedia device. Program code is applied to input and other data to perform the functions described herein and generate output information. The output information is applied to one or more output devices, which may include hardware devices, communication channels and other output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Referring to FIG. 1, therein illustrated is a block diagram illustrating a system for controlling access to a financial account, referred to generally as 100. The system may be comprised of an access terminal 105, an access processing network 150, mobile devices 108 and a financial account access system 102, each connected to a network 104. Optionally, a push network 106 connected to the network 104 and the financial account access system 102 may also be provided.

Access terminal 105 may be any networked computing device that enables a financial account to be accessed. For example, access terminal 105 may provide access to various types of financial accounts. Financial accounts may, for example, include monetary valued accounts issued from financial institutions such as a chequing or savings bank account, credit card accounts, electronic-wallet accounts, brokerage accounts or any suitable type of account that is valued in monetary terms. Other financial accounts may include credit bureau accounts that provide a credit rating score.

In one embodiment, an access terminal 105 may be a sales terminal where a buyer and a merchant interact in a sales transaction, wherein a buyer provides payment in exchange for a good or service. Such sales terminal may include a point-of-sale terminal at a retail location, office or other suitable location and/or environment where a financial transaction may be processed. In such embodiment, the financial account can be, for example, a credit card, debit card, or gift card, or any other suitable type of payment method which is connected to a payment account. In such embodiment, access terminal 105 may also be any networked computing device such as a laptop computer, computer devices, smart phones, other forms of hypermedia devices/interfaces, or any other suitable devices or platforms that are capable of processing e-commerce transactions and payments.

It will be understood that access terminal 105 is the terminal through which the access to a financial account may be attempted, wherein a card associated with the financial account (e.g., for the case of a credit, debit or bank card) may be present (Card Present). Alternatively, the card may not be present at the access terminal 105 (Card Not Present). The former scenario may arise, for example, when the access terminal 105 is a point-of-sale terminal. The latter scenario may arise in the cases of sales transactions being performed through e-commerce, mail order, telephone order or mobile commerce.

In some embodiments, access terminal 105 may control access to a bank account, such that access terminal 105 may be an Automated Teller Machine (ATM) terminal.

In other embodiments, access terminal 105 may be a computer terminal where a non-account holder is accessing a financial account for the purposes of conducting a credit bureau inquiry or a credit rating score inquiry.

In another embodiment, access terminal 105 may be any networked computing device (e.g., a laptop computer, a desktop computer, smart phone, or other forms of hypermedia interfaces/devices) capable of accessing the online website of the financial accounts on remote servers. For example, this may include accessing an online banking website for a bank account, accessing the credit card company portal for a credit card account, a trading platform for a brokerage account, or an e-wallet account website.

It will be understood that access terminal 105 may include a computer terminal with suitable software for performing the functions of receiving financial account information, and for collecting access data. Access terminal 105 may include a terminal add-on, as is described in greater detail below.

Access terminal 105 may be operatively connected to a communications network 104 (such as the Internet) for sending access data from access terminal 105 to financial account access system 102. Financial account access system 102 may also be operatively connected to network 104 to receive access data sent from access terminal 105.

Financial account access system 102 may send an authorization request to mobile devices 108, which are operatively connected to communications network 104. For example, mobile devices 108 may include cellular phones 108a, smartphones 108b (e.g., Apple® iPhone®, BlackBerry®, Android™ or other suitable cellular-connected computing devices such as a cellular-connected laptop computer or tablet computer 108c (e.g., Apple® iPad™).

In some embodiments, the authorization request may be sent to the mobile device 108 via the push network 106 that is configured to enable the financial account access system 102 to send messages to a mobile device 108 in real-time. Using push network 106, a message sent from financial account access system 102 may be immediately sent (i.e., 'pushed') to the mobile device 108 without delay (as opposed to 'pull' technology where the message retrieval may be initiated from the mobile device 108). Exemplary push networks 106 may include third-party notification services such as Apple® Push Notification Service or Blackberry® Push Service.

In some embodiments, the push network 106 may be embedded within the financial account access system 102. In such configuration, the mobile device 108 may be configured to run a background process that maintains an open network connection to receive immediate notifications directly from the financial account access system 102.

In some embodiments, a mobile device 108 may include a location-determination module for determining the geographic location of the mobile device 108. The location-determination module may be a cell-tower triangulation module or a Global Positioning System (GPS) module.

It will be understood by one skilled in the art that connections to communications network 104 for the subject embodiment may typically be wireless cellular connections. However, authorization requests may also be sent to mobile devices 108 connected through other types of network connections. For example, these may be wireless local area network (WLAN) technologies (e.g., "Wi-Fi"), a physical network connection to a computer network router or switch (e.g., Ethernet), or new and emerging cellular or telecommunications technologies (e.g., "WiMax"). Network connections may further be made through mobile devices connected with cellular-enabled modems through personal area technologies (PAN) such as Bluetooth. When connected through a cellular connection, authorization requests and responses may be communicated through cellular-specific services such as SMS text message notification. It will be understood that cellular-specific telecommunications services may also provide data services apart from voice services such that other hypermedia devices may communicate through applications that are mobile or interactive based.

Access processing network 150 may comprise computing platforms that allow access to a given financial account. When access terminal 105 requests access to a financial account, the access processing network 150 provides the final release of access to the financial account. That is, when an authorization request is sent to mobile devices 108, the response (indicating approval, denial or locking of financial account, as is discussed below) is relayed to the access processing network 150, which in turn, controls access to the financial account based on this response.

In the traditional scenario involving authorizing access to credit and debit card accounts, access processing network 150 may comprise one or more further processing platforms (not shown) when providing clearance for payment transactions. For example, the authorization at access processing network 150 may be processed through an acquiring institution (for providing credit and debit processing services), the payment card network (e.g., VisaNet®, MasterCard® Worldwide Network, American Express®, Discover Network, or Interac Payment Network) and/or the issuing institution (e.g., the processing network services from the banks, credit unions or institutions that issued credit or debit card directly to their respective cardholders).

Authorization may be required for any or all of these institutions, and the response to the authorization request from mobile device 108 may be factored into the granting or denial of access at one or more of these steps. Alternatively, the response to the authorization request from mobile device 108 may form a separate approval mechanism apart from these traditional approval mechanisms from the financial institutions.

As discussed in greater detail below, the authorization scheme in the traditional scenario may be referred to generally as a first-level of authorization, and the authorization mechanism provided by financial account access system 102, as is currently described, will be referred to generally as a second-level of authorization.

In other embodiments, access processing network 150 may comprise of the security gateways for allowing access to viewing credit score ratings and or credit bureau reports. For example, a security gateway may grant, based on the response to the authorization request provided at a mobile device 108, a third party member to perform a credit bureau inquiry or a credit rating score of their customer or their potential customer.

Financial account access system 102 may comprise a hypermedia interface 122 for providing a mechanism for sending an authorization request. Financial account access system 102 may also provide modules for providing programmatic logic to enable the sending and receiving of authorization requests associated with controlling access to financial accounts. These modules may comprise an authentication module 112, an account identification module 170 and an authorization relay module 110. Financial account access system 102 may further comprise persistent storage mechanisms. This may include an account database 124 for storing financial account information 134, a central repository database 120 for storing detailed access data 132 and optionally, an electronic receipts database 118 for storing electronic receipts 130 (for the embodiment where financial account access system 102 provides access to payment financial accounts in sales transactions). In some embodiments, financial account access system 102 may also include an incentive database 126 for storing incentives for conducting a transaction at an access terminal 105.

It will be understood by those skilled in the art that the various components of financial account access system 102 that provides persistent storage may be characterized as a remote data storage facility or a data storage facility.

Hypermedia interface 122 may be configured to provide access to destination accounts 140 on financial account access system 102. Such interfaces 122 may be provided through any suitable secure method of accessing remote information over a network 104 known in the art. For example, hypermedia interface 122 may include a website accessible by a web browser, an application programming interface (API), a web portal, a mobile website, a mobile application, and/or a smartphone application that is accessible by an installed application on mobile devices 108. Those skilled in the art will appreciate that programmatic logic for providing display functionality may be provided by hypermedia interface 122 on mobile devices 108, on a third-party display configuration server, or on any combination thereof. That is, it will be appreciated that applications providing access to destination account environments 140 on computing platforms 108 may be thin or thick clients that perform little or substantial amounts of local processing respectively on mobile device 108. The amount of local processing on computing platforms 108 may be variable depending on concerns such as the nature of computing platform 108 (e.g., cellular phone 108a may have limited processing resources such that it would be advantageous to reduce the amount of processing on cellular phone 108a).

Hypermedia interface 122 may be operable to alter the appearance of destination account environments 140 according to the nature of the mobile device 108. For example, a website may be adaptable to be displayed in a large format on a tablet computer 108c, or on a mobile format (e.g., having less graphics and consuming less bandwidth) on a cellular phone 108a or smartphone 108b. Similarly, native applications on these computing platforms 108 (e.g., and without limitation, including installed mobile applications on a smartphone 108b such as BlackBerry® or iPhone® devices) may likewise be adaptable to display information according to constraints of the mobile device 108 (e.g., smaller screen size and/or touch screen input).

Access to destination accounts 140 via mobile devices 108 may be secured through known methods of providing secure communications known in the art. For example, communications between the mobile device 108 and the financial account access system 102 may be encrypted using a shared secret that is initialized by a user upon their creation of destination account 140. During such account creation process, the shared secret may be separately provided at both the mobile device 108 and to the destination account 140 so as to reduce the likelihood that such shared secret may be compromised.

In another embodiment, public key cryptography may be used to ensure secure communications between mobile device 108 and financial account access system 102. In such embodiment, both a mobile device 108 and destination account 140 may not need to be initialized with a shared secret, but both devices may be configured to interact with systems for authenticating a public key (not shown). Such systems may include public-key infrastructure (PKI) containing certificate authorities. For example, security may be achieved through the use of Secured Socket Layers (SSL), and the corresponding SSL certificates.

Destination accounts 140 may belong to a subscribing buyer, or their associated supplementary accounts. Account identification module 170 may be configured to detect if the subscribing buyer is either a personal consumer, a business manager or supplementary accountholders. It will be understood that references to the term "buyer" below may refer to any of a personal consumer, a business manager or their associated supplementary accountholders. It will be understood that each subscribing account holder of a destination account 140 may be provided with a unique identifier and password. Destination account 140 may be enabled to provide authorization requests to buyer accounts and/or their supplementary accounts.

Account identification module 170 may be configured to identify the destination account 140 of a user from the financial account information presented at access terminal 105. In one embodiment where the financial account is a payment account in a sales transaction, the destination account 140 may be directly derivable or directly linked from a payment method account (e.g., a destination account 140 being determined from the credit card account (e.g., Visa Card) used to pay for the purchase). In such embodiment, account identification module 170 may be configured to receive a key indicator file representing the financial account from the access processing network 150. This key indicator file may be used by account identification module 170 to verify a cardholder against financial account information 134 stored in account database 124, and to determine the associated destination account 140. Such embodiment allows for a buyer to pay with their payment method without providing identification information for the buyer's registered destination account 140 on financial account access system 102.

In alternate embodiments, account identification module 170 may be integrated with the access terminal 105 (e.g., in a POS terminal add-on, as discussed below) such that identification of the destination account 140 occurs on access terminal 105 and not on financial account access system 102. In such embodiment, a destination account 140 may be determined at the access terminal 105 so that an indicator file representing the destination account 140 (e.g., an encrypted hash file of a destination account 140 identifier) may be communicated to financial account access system 102. In such embodiment, the access terminal (e.g., a POS terminal) may be able to automatically capture, detect and verify a buyer's destination account 140.

Additionally, in such embodiment, account identification module 170 may be linked to hardware components (not shown) operable to provide information about a destination account 140 registered with financial account access system 102. For example, such hardware component may include any type of hardware token reader such as a barcode scanner, a magnetic stripe reader, a smart card reader, an alphanumeric keypad or other suitable methods known in the art of securely reading in account information.

In further embodiments, account identification module 170 may also contain programmatic logic for creating a new account if no destination account can be determined to be associated with a buyer at the financial transaction, as is discussed below.

Authorization relay module 110 may be configured to send authorization requests to mobile devices 108 associated with the destination accounts 140 linked to the financial account information 134. When a user responds to the authorization request, the response may be relayed through authorization relay module 110 to the access processing network 150 for controlling access to the financial account for which access was sought. Authorization relay module 110 may also be operable to store the response in optional electronic receipt database 118 (indicated in dotted outline), so as to provide a detailed record of the transaction and that of the contents of the response provided by a user to the authorization request. In such embodiment, the response may form part of the electronic receipt 130 of the transaction that took place. If the transaction is ultimately denied, the response may still be stored to provide a record and receipt of the denial.

If electronic receipts database 118 does not form part of the system, the response may optionally be stored with the access data 132 in the central repository database 120.

Authentication module 112 may interact with authorization relay module 110 to provide user authentication at mobile device 108. Such user authentication may provide additional security benefits should a mobile device 108 become stolen or compromised. That is, even if a mobile device becomes compromised, the holder of the mobile device 108 may be required to provide authentication information beyond merely responding to the authorization request. Such authentication verifies that the holder of the mobile device 108 is indeed the expected recipient of the authorization request. Authentication may be in the form of a shared secret (e.g., a Personal Identification Number (PIN)), or may be in the form of biometrics (e.g., voice recognition, fingerprint scanner, retina or face recognition). Biometric recognition may be performed without additional hardware components, and may be performed through existing software and hardware on mobile devices 108. For example, fingerprint scanning, retina scanning or face recognition may be performed using a camera present on mobile device 108. Additionally or alternatively, mobile device 108 may comprise additional hardware elements for performing such biometric authentication.

In the case of a PIN authentication, the PIN may be a PIN designated and selected solely for the destination account. Alternatively, it may be the PIN associated with the financial account (e.g., credit card), and the mobile device 108 may act as the numeric keypad that may otherwise be present at a point-of-sale terminal, as is described in greater detail below.

Account database 124 may store information 134 related to financial accounts, which may be linked to destination accounts 140. Such information may include the account number of the financial account, type of account (e.g., MasterCard, Visa, etc.), and information relating to how the access processing network 150 may be contacted. For example, this may be the Internet Protocol (IP) address for initiating the authorization details with the access (payment) processing network 150, and/or the protocol and type of information required for communicating the contents of a response to an authorization request from a user. Such information may be accessed by authorization relay module 110 so that authorization relay module 110 may properly relay the response to access processing network 150.

Incentive database 126 may store information 136 related to providing incentives to conduct a transaction at an access terminal 105. In some embodiments, these incentives may be financial incentives (e.g., discounts, coupons, or promotions) to conduct a transaction at a particular merchant. In another embodiment, the incentive may be a contest where a user receives an entry for conducting a transaction at an access terminal. This may, for example, be the case if the access terminal is an Automated Teller Machine (ATM), and a banking institution is operating a contest to encourage use of ATMs instead of tellers. As is discussed below in relation to FIG. 8, the incentive database 126 may also store the physical geographical addresses of the locations of access terminal 105 so that the incentives may be provided to a user's mobile device 108 in a location-relevant way. In some embodiments, the incentive database 126 may also store an Internet Protocol address (IP Address) of the access terminal 105. Such IP address may also be used in determining the location of the access terminal 105.

Central repository database 120 may contain access data 132. In some embodiments, access details may comprise detailed information about the nature of the access. For example, in the context of a credit bureau inquiry, such access details may include the institution requesting the information, and the purpose for which the inquiry is being made (e.g., a mortgage request, the signing up of a new cellular phone contract, etc.). Such information may be collected explicitly or implicitly by access terminal 105; i.e., it may have to be explicitly indicated by the user, or may be implicit through the software application running on access terminal 105 (e.g., an credit bureau inquiry built inside a mortgage request application). In such embodiments, a user may be required to respond to an authorization request in order to allow a credit bureau inquiry to commence (in accordance with the responses to authorization requests discussed below).

In another embodiment, where a financial account is being accessed in the context of a sales transaction, such access data may be transactional data 132 from the sales transaction captured at access terminal 105. For example, central repository database 120 may contain a detailed list of transactional data and elements that are typically passed from the merchant (M) to a buyer.

The captured transactional data may be greater than Level 1 Merchant Data directly from subscribing merchants' (M) POS environments 105, during the payment process of the sales transaction. All financial transactional data 132 and electronic receipts 130 may include the financial transaction fields and may expand on further fields as the payment industry emerges. Presently in the industry, there are 3 levels of merchant data. Level 1 Merchant Data is the basic level and Level 3 Merchant Data currently contains the most detailed list of transactional information:

Level 1 data may contain: Method of Payment, Card Number (of the method of payment, e.g., credit card number) & Expiry Date, Subscribing Buyer's Billing Address, Postal/Zip Code, Purchase Invoice Number, Merchant Name, Transaction Amount and Date/Time.

Level 2 data may contain the information in Level 1 data, and also: Tax Amount, Customer Code, Merchant Postal Code, Tax Identification, Merchant Minority Code and Merchant State Code Level 3 data may contain the information in Level 2 data, and may additionally contain: Item Product Code, Item Description, Item Quantity, Item Unit of Measure, Item Extended Amount, Item Net/Gross Indicator, Item Tax Amount, Item Tax Rate, Item Tax Identifier, Item Discount Indicator, Ship from Postal Code, Freight Amount, Duty Amount, Destination Postal Code, Destination Country Code and Alternate Tax Amount.

It will be understood that captured financial transaction data may additionally or alternatively include other fields as the payment industry evolves. For example, such fields may include: Subscriber's Name and Account information; Merchant ID #; Merchant Details; Merchant Address; Merchant Telephone (and URL address where applicable); Server Name; Table # (where applicable); Check # (where applicable); POS Terminal #; Method of Payment and Expiry Date (where applicable); Name registered on method of payment; Retrieval #; Trace/Reference #; Approval #; Authorization #; Transaction amount details; Sub Total; Tax Amount (and or Alternate Tax Amount); Tip/gratuity Amount; Cashier's ID/Server's ID; Total Amount; Customer Code (where applicable); Tax Identification; Merchant Provincial/State Code; Item Product Code; Item/Service Description; Detailed Line Description of Items/Services Purchased; Item/Services Quantity; Item/Services Unit of Measure; Item/Services Extended Amount; Item/Service Net/Gross Indicator; Item/Service Tax Amount; Item/Service Tax Rate; Item/Service Tax Identifier; Item/Service Discount Indicator; Ship from Postal Code Freight Amount; Customs Tax and Duty Amount; Destination Postal Code; and Destination Country Code.

In the embodiment where financial accounts comprise payment accounts and access to such payment accounts are in the context of sales transactions, financial account access system 102 may be provided with an electronic receipts database 118 so that financial account access system 102 may perform also as an electronic receipt system. In such embodiment, electronic receipts 130 may be formed from the transactional data 132 described above, and may be accessible on mobile devices through destination accounts 140 on mobile devices 108.

It will be understood by those skilled in the art that account database 124, central repository database 120 and electronic receipts database 118 may be organized and structured according to a suitable schema for organizing such information. Such databases may be provided by known database technologies in the art such as Microsoft SQL Server, IBM DB2 or MySQL. It will be further understood that although account database 124, central repository database 120 and electronic receipts database 118 are illustrated as databases, that any other suitable persistent storage technologies may also be used to accomplish similar tasks (e.g., a persistent file format).

In the embodiment where financial account access system 102 may also perform as an electronic receipt system, there may also be additional modules (not shown) for performing tasks associated with the electronic receipt system. At the access terminal 105, this may include a POS terminal add-on. On the financial account access system 102, this may include a receipt intake interface, a consumer module, a merchant module, a business manager module and/or a reports module. It will be understood that although such modules may be discussed in the context of an electronic receipt system, some of the functionality contained therein may be suitable for use in the financial account access system 102.

A POS terminal add-on at access terminal 105 may be configured to be associated with the seller such that when financial transaction data is sent from POS terminal add-on to the electronic receipt system, the generated electronic receipt 130 may be sent a destination account 140 registered in the electronic receipt system.

Receipt intake interface may receive financial transaction information 132 from the point of sale terminal add-on. This information is stored directly into central repository database 120. Thorough and complete financial transaction data 132 may be stored to enable the generation of electronic receipts 130 containing variable amounts of merchant level data according to the type of account environment (personal consumer, business manager or merchant).

Consumer module may be operable to store and access account information related to a registered consumer, i.e., consumer account data. Such information may include contact information, payment information, preferred information or other suitable information. Consumer module may also be operatively connected to hypermedia interface 122 to provide information for a consumer destination account environment (a type of destination account 140) to mobile device 108. To enable the functions available in consumer destination account environment, consumer module may also be operatively connected to electronic receipts database 118 to allow access to electronic receipts 130, and to central repository database 120 to allow access to financial transaction data 132.

Merchant module may be configured to store and access information related to a registered merchant, i.e., merchant account data. Such information may include merchant contact information, the types of product or services provided, or other suitable information for keeping track of registered merchants. Merchant module may interact with hypermedia interface 122 to provide information for a merchant account environment (a type of destination account 140) to computing environments 108. To enable the functions available in merchant account environment, merchant module may also be operatively connected to electronic receipts database 118 to allow access to electronic receipts 130, and to central repository database 120 to allow access to financial transaction data 132.

Business Manager module may be configured to store and access information related to a registered business manager, i.e., business manager account data. Such information may include business manager contact information, or other suitable information for performing functions connected with operation of a business manager. Business manager module may be operable to interact with hypermedia interface 122 to provide information for business manager account environments (a type of destination account 140) to mobile device 108. To enable the functions available in business manager account environment, business manager module may also be operatively connected to electronic receipts database 118 to allow access to electronic receipts 130, and to central repository database 120 to allow access to financial transaction data 132. It will be understood that 'Business Managers' may comprise Business Owners, Small medium Enterprises (SME's), or Corporations.

Business manager module may provide functionality similar in nature to consumer module because business managers may be buyers in the financial transaction that resulted in the captured financial transaction data 132 at the POS terminal add-on. However, business manager module may provide additional and further functionality catered to business managers. For example, this may include expense breakdown reports not available to customers.

Consumer destination account and business manager destination account may provide the capability of creating supplementary accounts under their primary account. As a supplementary accountholder partakes in sales transactions, authorization requests may be sent to both the supplementary account and/or the devices registered under the primary account (the grandfather account). Authorization may be required from one or both accounts for the transaction to carry through. Such double authorization may, for example, create immediate and transparency and accountability between the employee and the employer if the employer is a primary business manager account holder and an employee is a supplementary account holder.

As noted, in some embodiments, financial account access system 102 may be provided with an electronic receipts database 118 that stores electronic receipts 130 generated from financial transaction data 132 stored in central repository database 120. Each electronic receipt 130 may comprise variable amounts of merchant level data, and may be searchable according to various fields by the reports module.

In some embodiments, authorization requests may be configurable to contain a variable amount of merchant level data based on the account type of the registered user. For example, an authorization request sent to a consumer destination account environment may contain a basic, or reduced set of data fields that contain only the Level 1 merchant data, whereas an authorization request sent to business manager destination accounts may be configured to contain merchant level data including Level 1, 2 or 3 merchant data. Providing such tiered access to data on electronic receipts 130 may be advantageous because Business Managers may be willing to pay additional fees to view the additional data (e.g., for viewing transactional data for historical transactions, as discussed below).

It will be understood that while electronic receipts 130 for consumer and business manager accounts were discussed with respect to increasing levels of merchant level data from level 1 to level 3 respectively, any variations of data fields may be assigned to the different account types. For example, in an alternate embodiment, there may be data fields that are present for consumer accounts, but not for business managers accounts. Accordingly, any embodiments where different numbers of data fields appearing on an authorization request corresponds to account types are within the contemplation of the subject embodiments.

Report Module may be configured to access information stored within electronic receipts 130 stored in electronic receipts database 118 or detailed transaction data 132 stored in central repository database 120 to generate reports viewable in destination account environments 140. Reports may be generated using searchable fields to generate reports for display in hypermedia interfaces 122 of consumer destination account environments or business manager destination account environments.

The reports module may be operable to combine response data with the following fields to generate reports according to the following: Time; Merchant name; Merchant category/SIC Code; Geographic location; Payment method; Account level; Tax Breakout and calculations; Dollar amount; Tagging and any other suitable searchable field. Reports may be able to provide great detailed search results, as well as provide a graphic illustrated dashboard overview. These reports may be printed, sent as an attachment and or downloaded to the desktop or a computer.

The reports module may also be configured to provide search fields in relation to the responses received from authorization requests. For example, this may include providing the ability to search according to the number of approvals, denials or locks selected (discussed in greater detail below). It will also be understood that such searches may be combined with search fields of the transactional data recorded. For example, such searches may include the number of denials that a primary account holder (e.g., an employer) has entered for a given supplementary account holder (e.g., an employee), or the merchant where most of the denials came from. Furthermore, reporting capabilities including the ability to produce "response activity reports" may be provided. Such reports may include a "fraud activity report".

Figure 2:
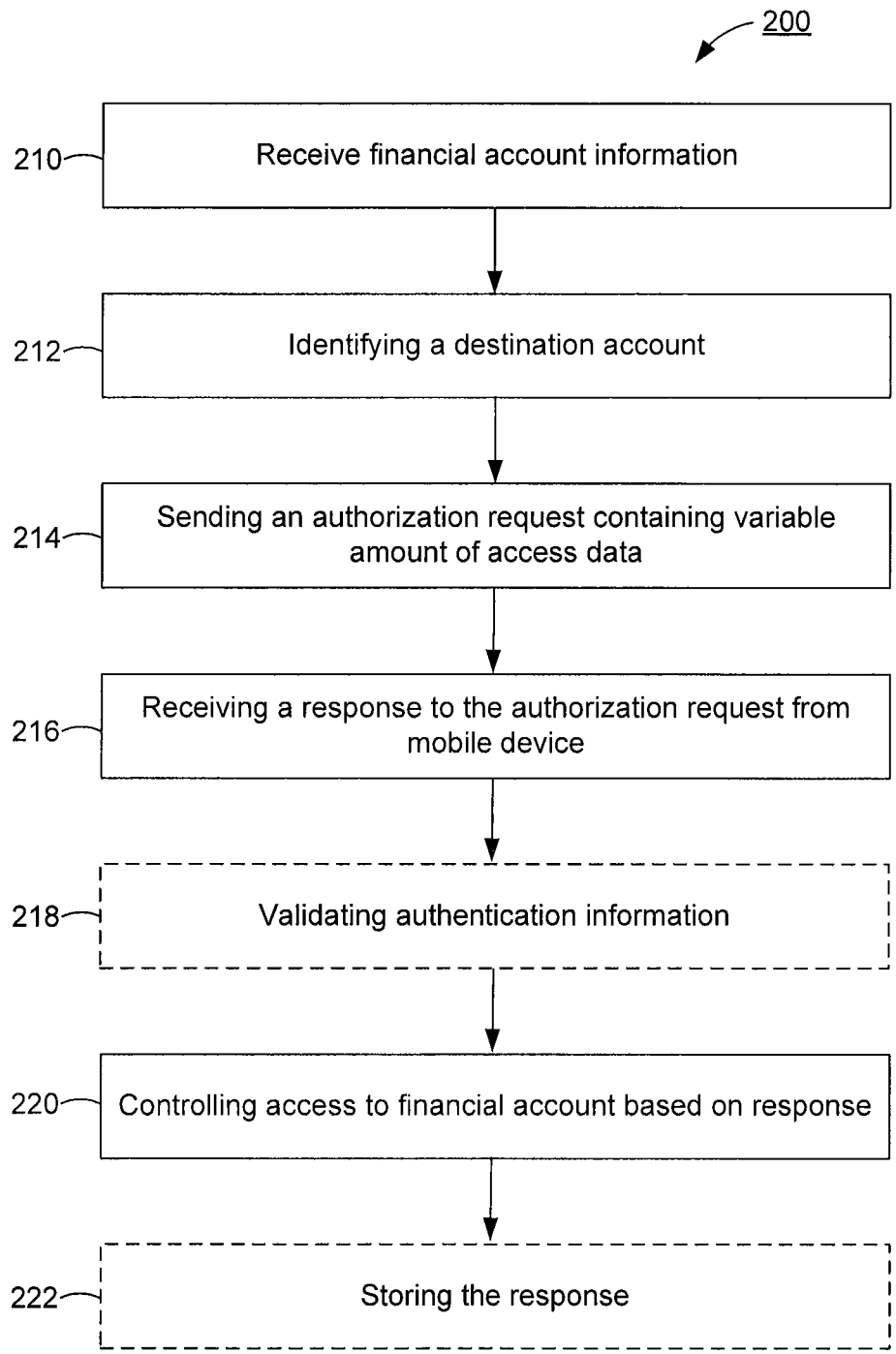
FIG. 2 is a flowchart diagram illustrating the steps of controlling access to a financial account.

Referring to FIG. 2, therein illustrated are the steps of a method for controlling access to a financial account, referred to generally as 200.

At step 210, financial account information is received by access terminal 105. Such financial account information may be associated with a credit, debit card or another registered account payment vehicle used for payment when access terminal 105 is a sales terminal used in a sales transaction. This step may also include the account identification module 170 seamlessly executing the detection, capture, identification and verification of the buyer's qualification, eligibility and destination account 140.

In such embodiment, a buyer may present financial account information for payment at the POS terminal or environment 105. As is discussed below, payment may be in forms that require external authorisation/settlement (i.e., requiring an access processing network such as a credit card), or not (e.g., cash). Financial account information may include the credit card or debit card number, expiry date, verification code, the name of the cardholder as it appears on the card and/or an encrypted version of the PIN. Such information may be transported to the access processing network 150 for verification so that the information contained therein corresponds to active payment accounts. Access processing network 150 may also use the financial account information to perform card payment authorization and settlement clearance procedures according to methods known in the art. It will be understood that the access control and authorization described in the subject embodiment is a level of authorization additional to that which is provided with the authorization process typically provided with payment card accounts as earlier described.

Examples of payment methods requiring an access processing network such as a payment processing network include credit accounts, debit accounts, smart cards, charge cards, contactless payments, mobile payments or biometric payments, radio frequency identification (RFID) payment methods, contactless payment methods, Near Field Communication (NFC) payments and chip-embedded smart cards. In some embodiments, payment technologies may include providing a mobile application on mobile device 108 that is configured to indicate payment account details. In one embodiment, the mobile application may provide a formatted bar code to represent financial account information on the mobile device 108. Such formatted bar code representation may contain the financial account information normally stored in the earlier mentioned payment cards so as to remove the need of a buyer to separately carry such payment cards.

Also, payment technologies may include providing a mobile application on the mobile device 108 that is configured to store and indicate the buyer's destination account 140, which will correlate to consumer module or business manager module. The benefit here is that the buyer can present the barcode to the merchant to have scanned or read at the POS add-on environment, to ultimately receive authorization requests for the transaction being requested at the merchant. Once the destination account 140 has been established, subscribing buyers may be able to seamlessly receive authorization requests for that same transaction or other future transactions.

Authorization requests may also be received for payment methods that do not require approval from an access processing network 150; i.e., for payment methods not directly associated or connected to a subscribing buyers' credit account, debit account (and) or funds account. For example, such payment methods may include cash cards, gift card, or any other suitable payment method not requiring access to an access processing network 150, but nevertheless desiring authorization. Such payment technologies may also include providing a mobile application on a mobile device 108 that indicates monetary value or a denomination. In one embodiment, the mobile application may provide a formatted bar code to represent this information on the mobile device 108. For payment methods not requiring access to an access processing network 150, such formatted bar codes may contain the monetary value or denomination relating to a gift card or store credit such that scanning this bar code allows for payment at the sales terminal 105.

In such embodiment, authorization relay module 110 of financial account access system 102 may communicate directly with the access terminal 105 to allow the requested access. Since no communication with an access processing network 150 is necessary, the account (e.g., a cash card/gift card account) may need to be registered with financial account access system 102 so that when the cash or gift card is used, it may trigger an authorization request.

When personal consumers and business managers sign up for the services of receiving authorization requests, they may be required to provide key data elements within their account profile to complete the account setup. These data elements will be associated to their credit account, debit account and (or) fund account(s) from where the payment and (or) funds will derive from, for the purchase of their transactions. They will also be required to provide personal information about themselves within their account profile. The account acquisition process is discussed in greater detail below.

At step 212, a destination account 140 is identified from the financial account information. For example, an indicator file representing the financial account information may be sent from the access processing network 150 to the financial account access system 102 so that account identification module 170 may identify a destination account 140 from the indicator file. In some embodiments, identification of the destination account 140 may be with reference to financial account data stored in account database 124. In other embodiments, the destination account 140 may be identified directly from the indicator file without reference to any database (e.g., if the identifier for the destination account 140 is a hash value of financial account information). Alternatively, in embodiments where account identification module 170 are embedded within access terminal 105, identification of the destination account 140 may occur at the access terminal 105.

For embodiments in which financial account access system 102 may also operate as an electronic receipt system, account recognition module 170, which may be embedded and integrated with the earlier-described POS terminal, may seamlessly detect, capture, identify and verify the subscribing buyer's qualification, eligibility and destination account. Such process may occur by verifying the buyer's account information with registered accounts stored in consumer module or business manager module. If an account cannot be determined, a new account acquisition process may be initiated (see FIG. 7, below).

When a financial account is being accessed in the context of payment for a sales transaction, transactional data from the sales transaction including key data elements may be detected, identified, captured and tracked from the subscribing buyer's method of payment at the Point of Sales (POS) add-on; all in real-time. As mentioned above, such transaction data may be greater than Level 1 Merchant data, and may comprise various fields as indicated above. Immediately upon capturing the transactional data, the embodiment may securely transmit the transactional data to the financial account access system 102. In turn, financial account access system 102 may store the financial transaction data 132 in a secure remote electronic data storage environment such as central repository database 120; all in real-time.

At step 214, authorization relay module 110 may send an authorization request containing a variable amount of the access data to a mobile device 108 linked to the destination account 140. As noted earlier, transactional data from a sales transaction may form the access data included with the authorization request. Authorization requests may appear on mobile devices 108 through hypermedia interfaces 122. Authorization requests may take place in various formats such as in a formatted SMS text message to mobile communications device 108; the sending of an electronic message to a proprietary formatted application (also known simply as an 'app') that is embedded or installed on the mobile device (such an example can be seen as sending a 'Push' message to the mobile device 108 via Push Network 106, as discussed above); or a notification message to destination account 140. Example screenshots of authorization requests appearing on mobile device 108 are provided in FIGS. 4A and 4B, described in detail below.

In some embodiments, the authorization request may allow mobile device 108 to authenticate the account holder of the destination account 140 at the mobile device 108. As mentioned earlier, this may be in the form of a PIN verification or a form of biometric authentication. It will be understood that the accountholder of the destination account 140 may not necessarily be the primary account holder, and may in fact be any supplementary account holder associated with the destination account 140. The authentication step may be configured to authenticate the primary and/or the supplementary account holder, as earlier discussed.

At step 216, authorization relay module 110 may receive a response to the authorization request from mobile device 108. This response may contain the contents of what the user selected on mobile device 108. As is described in greater detail below, such response may comprise a message indicating an approval, denial, locking of the access to the financial account or the means to directly allow the user to be in contact with their financial institution. The option of directly allowing contact with the financial institution may be useful in the event the user wishes to obtain further clarity on transactional behaviour (such as, for example, if the user denies access to their financial account and wishes to report a fraudulent activity pertaining to their financial account). In embodiments where the authorization request allows mobile device 108 to authenticate the accountholder of the destination account 140, there may also be authentication information incorporated in the response.

At optional step 218 (indicated in dotted outline), authentication module 112 may validate and verify any authentication information provided in the response, if present. For example, authentication module 112 may reference any digital representation of the biometric information associated with the account holder stored on account database 124, and compare it against the value retrieved from the mobile device 108. In one scenario, the authentication information may include an image or representation of a retina or iris taken by the camera on a mobile device 108. Such image or representation may be compared against a copy of such image or representation stored on account database 124 to validate and verify the user requesting access to the financial account.

In an alternate embodiment, validating the biometric information may be performed by a third-party validation service such that biometric information need not be stored on financial account access system 102. In a further embodiment, the validating may occur directly on the mobile device 108 such that the authorization request may contain verification data for the biometric data to be compared against.

At step 220, the response may then be relayed to the access processing network 150 so that access to the financial account may be controlled based on the response. If the response contains an approval of access to the financial account, access may be allowed such that the accessing (payment) processing network 150 allows the desired access transaction (e.g., payment of funds from the financial account) to be completed. If the response contains a denial of access to the financial account, access may be denied such that the accessing (payment) processing network 150 does not allow the desired transaction to complete. As is discussed in greater detail below, if the response indicates that the financial account is to be locked, access (payment) processing network 150 may proceed to lock the financial account so as to prevent any further access.

If access is allowed, the relaying may involve sending an indicator to the payment processing network to release funds from the financial account. In some embodiments, this may involve sending a request for authorization (a different authorization request than the one sent to the mobile device 108) to the payment processing network to continue with the transaction as it relates to the financial account, and sending a settlement file to the payment processing network to release funds from the financial account.

At step 222 (indicated in dotted outline), authorization relay module 110 may optionally store the response in electronic receipts database 118 (if available), or central repository database 120. In one embodiment, the response may be stored in the destination account 140. In the embodiment where financial account access system 102 may be provided with electronic receipt database 118, the record of the response to the authorization request may form the receipt of the transaction. In another embodiment, the response may be stored separately from the electronic receipt 130 that may be generated after approval and execution of a sales transaction is completed.

The storage of the response may be performed regardless of whether the access is actually approved. That is, even if the transaction is denied or the response indicated that the financial account should be locked, the authorization relay module 110 may make a record in electronic receipt database 118. Such record may be particularly advantageous if any discrepancy arose as to whether or not an account holder took action to stem any losses from the fraudulent use of their financial account, so that the record of the response may be referred to. That is, if an account holder's credit score were to be damaged through fraudulent use of a credit card account, and a dispute arose as to whether the cardholder took measures to stem losses, the account holder may be able to refer to the record of the response stored in the financial account access system 102 as proof that the user rejected the fraudulent transaction and/or locked the account from further use. Further, a credit card company (e.g., Visa® or MasterCard®), or their issuing bank may modify its cardholders' agreement so that liability coverage for insurance purposes may cease to apply to cardholders that either do not have such features enabled on their mobile device such that they are able to reject and/or lock the account if they receive an authorization request from a fraudulent transaction.

The different components described in FIG. 1 may be configured in different embodiments to carry out the steps of the method described in FIG. 2. Particularly, the coordination of the network messages being sent amongst access terminal 105, access processing network 150, financial account access system 102 and mobile device 108 may be modified while still maintaining the spirit of the claimed subject matter. It will be understood that the messages described will be communicated via network 104 using known methods of network communications in the art.

Figure 3A:
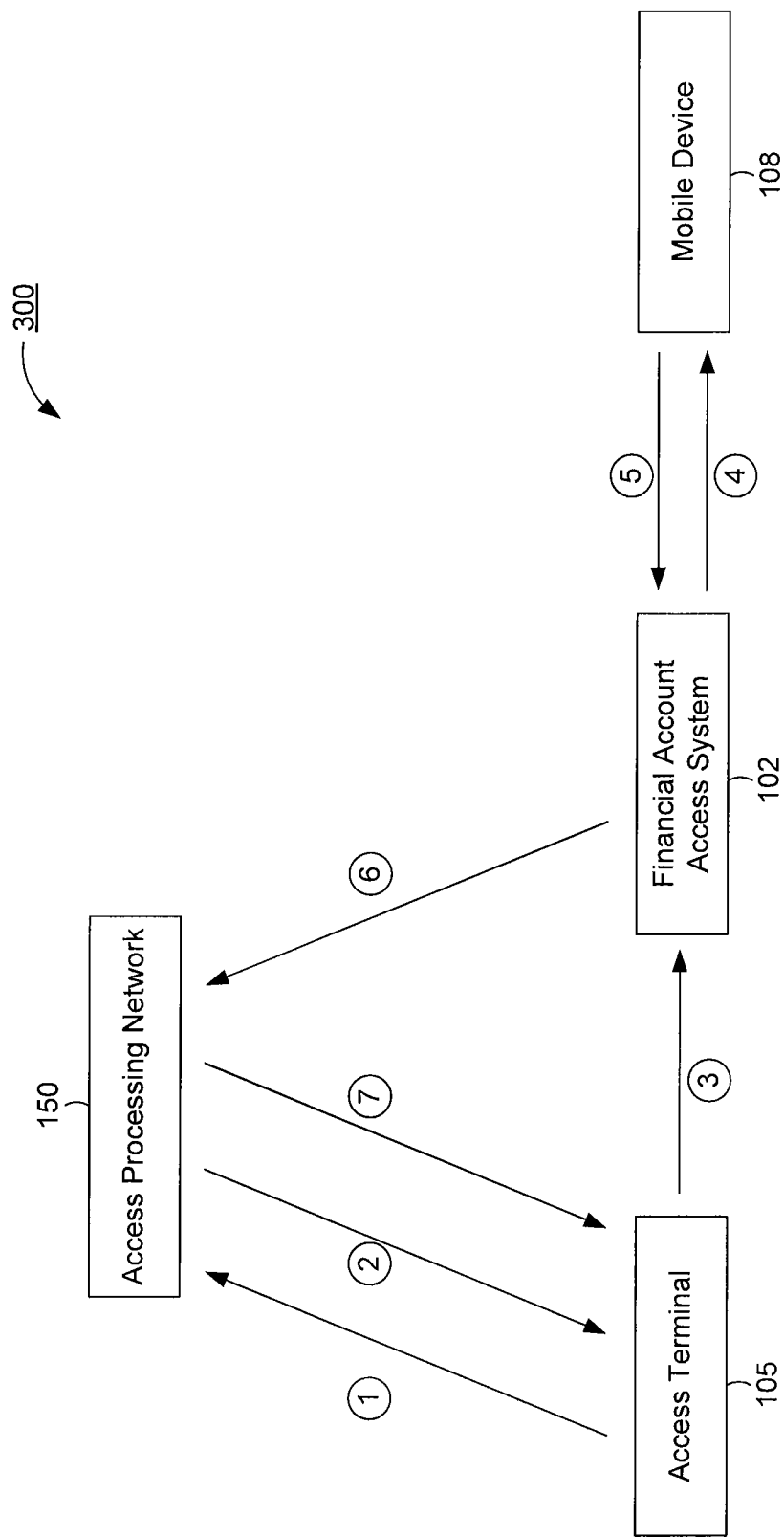
FIGS. 3A-H are schematic diagrams illustrating the sequential flow of messages of a method of controlling access to a financial account, in various separate embodiments.

Referring to FIG. 3A, therein illustrated is a schematic diagram illustrating the sequential flow of messages in one embodiment of the subject financial account access system 102, referred to generally as 300.

When financial account information is provided at access terminal 105, the information may be initially sent to the access (payment) processing network 150 for verification and the first-level of authorization of the information provided therein (message 1). If such authorization is allowed, access (payment) processing network 150 may send a response (message 2) indicating that communication with the financial account access system 102 to obtain the second-level of authorization through the mobile device 108 may proceed.

Access terminal 105 may then be operatively configured to send an authorization request initialization message (message 3) to financial account access system 102. Such message may include access data (e.g., detailed transaction data from a sales transaction) for association with an identified destination account 140, as described above. It will be understood that the term "authorization request initialization message" may be distinguished from the financial account information sent in message 1 as it is a request for the second-level authorization provided by the financial account access system 102. Authorization relay module 110 may then send an authorization request message to a mobile device 108 linked to the destination account 140 (message 4). The mobile device 108 may then be able to record and send a response back to the financial account access system 102 (message 5).

Such response may then be relayed to access (payment) processing network 150 (message 6), which may then complete the second-level authorization process provided by financial account access system 102. Based on the response, access (payment) processing network 150 may approve/deny the transaction and/or lock the financial account (message 7).

Figure 3B:
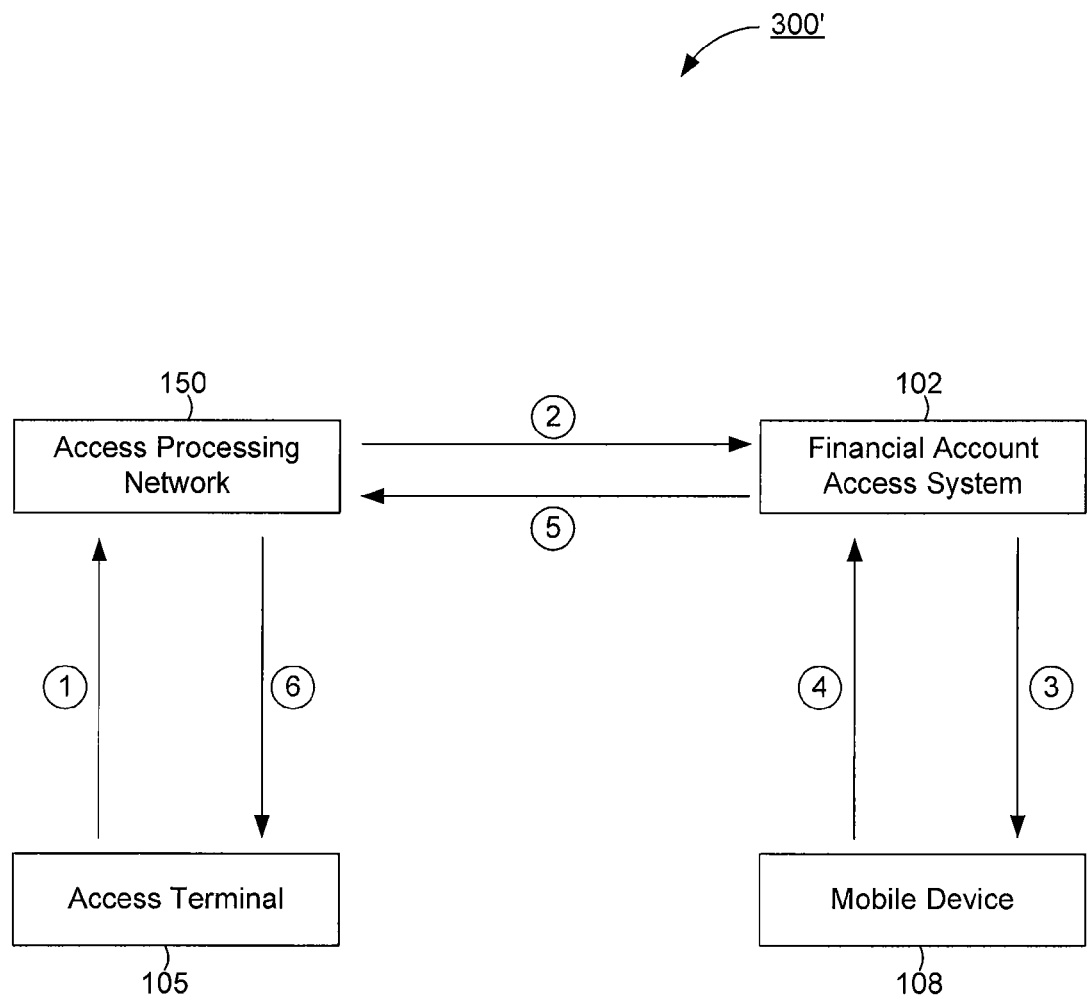

Referring to FIG. 3B, therein illustrated is a schematic diagram illustrating the sequential flow of messages in another embodiment of the subject financial account access system 102, referred to generally as 300'. In such embodiment, the authorization request initialization message (message 2 in FIG. 3B) may be sent from the access processing network 150.

Message 1 involves the initial sending of financial account information along with a payment request from access terminal 105 to the access (payment) processing network 150. Access processing network 150 may then send an authorization request initialization message (message 2) to financial account access system 102. Such authorization request message may include access data (e.g., transaction data in a sales transaction and a key indicator file). Such message may also enable a destination account 140 to be identified from the financial account at financial account access system 102.

Authorization relay module 110 may then send an authorization request message to a mobile device 108 linked to the destination account 140 (message 3). The mobile device 108 may then be able to record and send a response back to the financial account access system 102 (message 4). The response is then sent to access (payment) processing network 150 so as to allow for the completion of the second-level of authorization (message 5). The second-level approval/denial/lock message, along with the first-level approval/denial message may then be communicated back to access terminal 105 to complete the authorization process (message 6).

As discussed below, in some embodiments, financial account access system 102 may be embedded with access (payment) processing network 150, and may constitute an additional layer of authorization for such access (payment) processing networks 150 in addition to the traditional access control required by the clearinghouses/acquirers, payment associations and/or issuing institutions, as earlier discussed. In such embodiments the messages 2 and 5 may not be required because access processing network 150 and financial account access system 102 are parts of the same system.

Figure 3C:
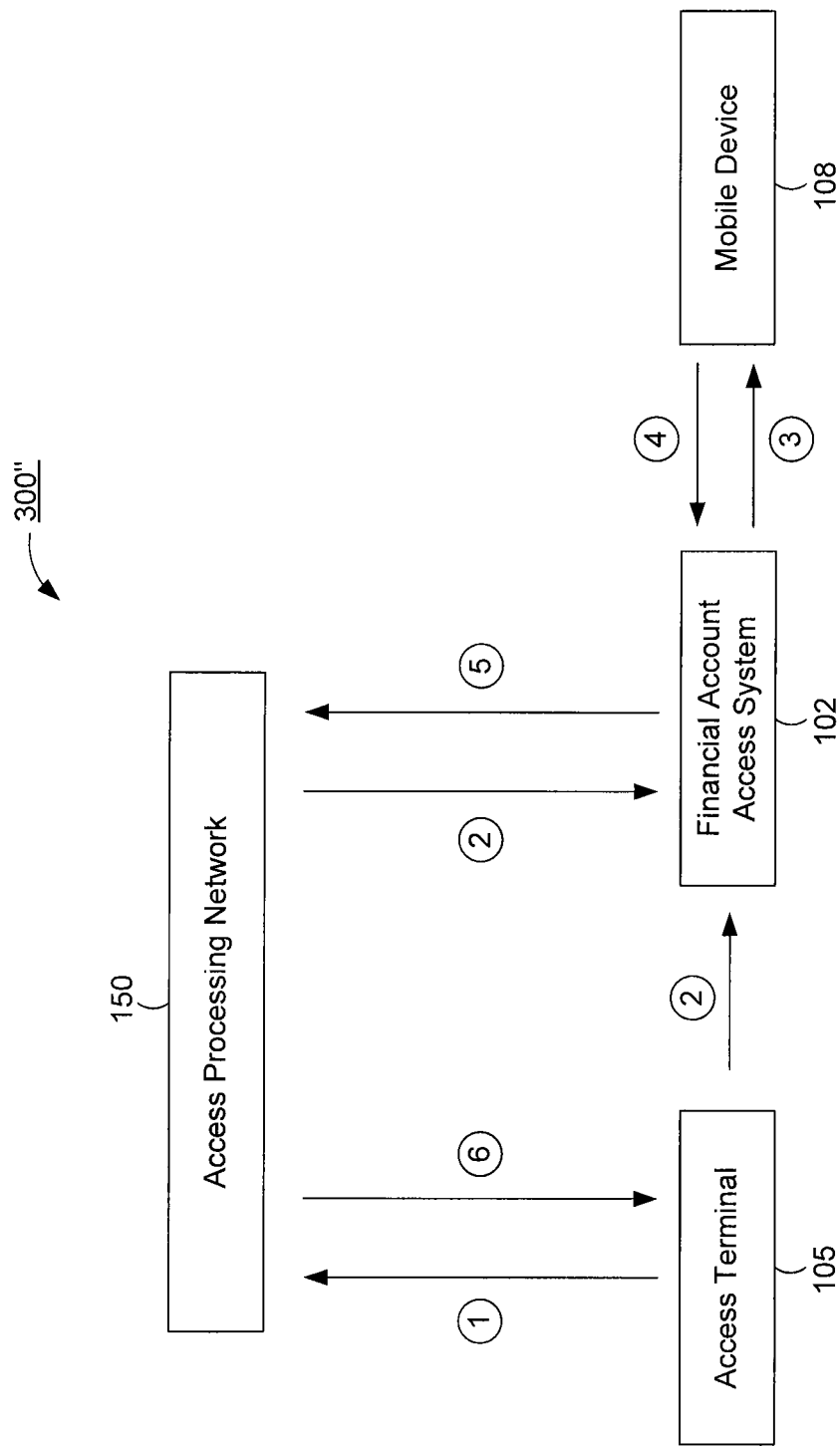

Referring to FIG. 3C, therein illustrated is a schematic diagram illustrating the sequential flow of messages in a further embodiment of the subject financial account access system 102, referred to generally as 300". In such embodiment, there may be a simultaneous sending of authorization request initialization messages (messages labelled '2') to the financial account access system 102 from both access processing network 150 and access terminal 105.

Message 1 involves the initial sending of financial account information along with a payment request from access terminal 105 to the access (payment) processing network 150. This may be performed as a result of a buyer engaging the merchant by presenting a method of payment to the merchant, where financial account information is provided by the method of payment. Next, the two authorization request initialization messages (labelled messages '2') may simultaneously be sent to financial account access system 102 from both the access terminal 105 and also the access processing network 150. Such redundancy may be advantageous in providing a failsafe in the case of network failure of a communication link between the access processing network 150 and the financial account system 102, or the financial account access system 102 and the access terminal 105. In such scenario, if either communication link goes down, second-level authorization through the financial account access system 102 may nevertheless be achieved because one of the two authorization request initialization messages may still reach financial account access system 102.

Furthermore, such duplicated authorization request initialization messages may allow for an added level of security feature by allowing the authorization request initialization messages to be verified. That is, when received at financial account access system 102, the two messages can be compared one against the other to ensure that access terminal 105 has not been compromised to send out a false authorization request initialization messages. In another embodiment, financial account access system 102 may also contain an indicator file that may be compared against the two messages labelled '2' of this embodiment to verify the legitimacy of the authorization request initialization messages. Such verification information may be an indicator file that represents a hash value of a secret shared amongst access processing network 150, access terminal 105 and financial account access system 102.

Authorization relay module 110 may then send an authorization request message to a mobile device 108 linked to the destination account 140 (message 3). The mobile device 108 may then be able to record and send a response back to the financial account access system 102 (message 4).

Such response may then be relayed to access (payment) processing network 150 (message 5), which may then complete the second-level authorization process provided by financial account access system 102. Based on the response (and the authorization deriving from the traditional first-level authorization), access (payment) processing network 150 may approve/deny the transaction and/or lock the financial account (message 6).

In such embodiment, the first-level and second-level approvals/denials/locks were illustrated as being combined together into message 6. However, it will be understood that such approval/denial/lock messages coming from access processing network 150 may be separated into different messages.

In various embodiments, the financial account access system 102 may be provided as a separate module (i.e., a financial account access module) embedded within another system or component. For example, in some embodiments, such module may be embedded within the access processing network 150. In other embodiments, such module may be embedded within the mobile device 108. In further embodiments, such module may be embedded within the access terminal 105.

Figure 3D:
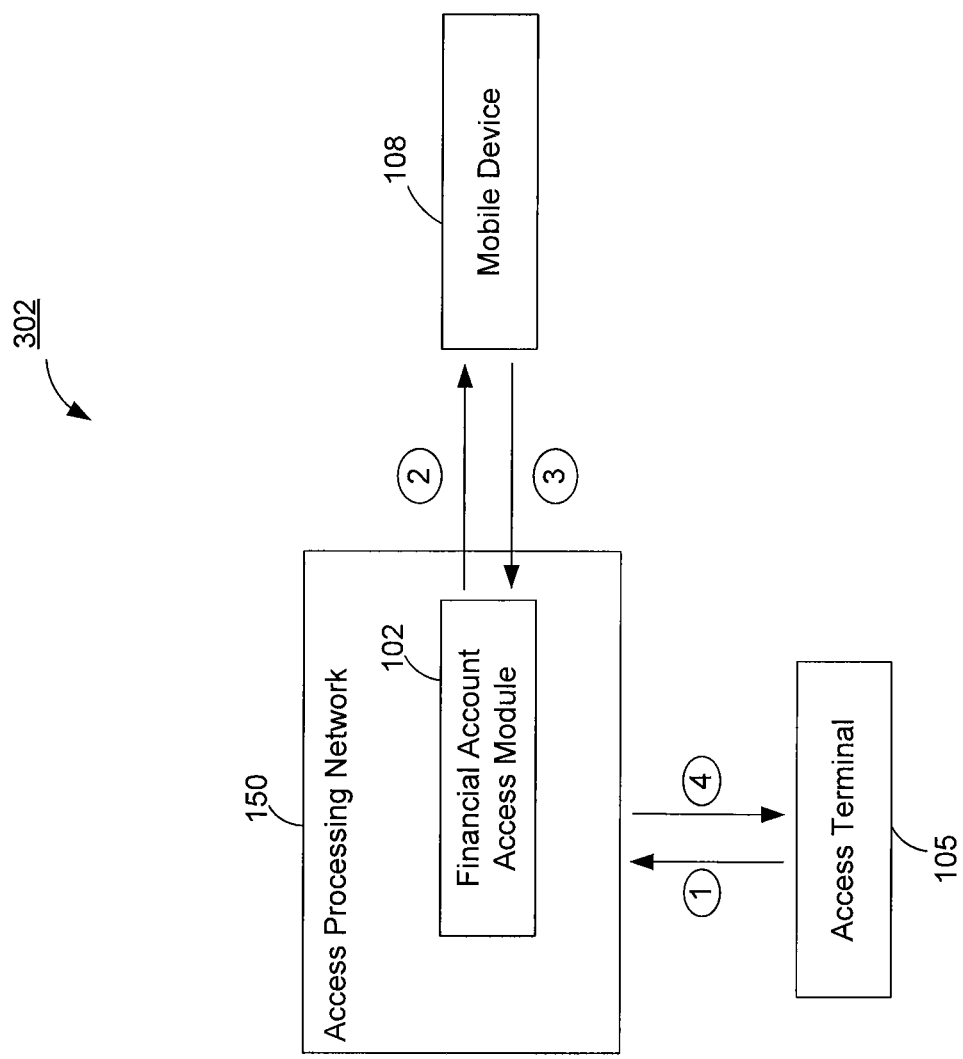

Referring to FIG. 3D, shown there is a schematic diagram, referred to generally as 302, in which the financial account module 102 can be provided as part of access processing network 150. This configuration may allow the identification of a destination account 140 and the storage of access data (e.g., transaction data in a sales transaction) to be performed locally on the access processing network 150 without sending such data over the network (as may be required if financial account access module 102 is stored on a separate remote server). By not sending such information over the network, the security of such information may be increased. In such configuration, the payment request can be initialized (message 1) and completed (message 4) in a manner similar to the configuration shown in messages 1 and 6 of FIG. 3B. The financial account access module 102 may also send an authorization request message to a mobile device 108 (message 2), and receive the response back (message 3) in a similar manner (i.e., corresponding to messages 3 and 4 in FIG. 3B).

In some embodiments of such configuration, the financial account access module 102 may be fully integrated into access processing network 150. For example, the financial account access module 102 may be provided as a programmatic module 102 stored on the same physical or virtual server as access processing network 150 such that the access processing network 150 is able to directly communicate with mobile device 108.

In other embodiments, such module 102 may be provided as an independent component (e.g., a separate server) within the internal environment of the access processing network 150 (i.e., if the access processing network 150 includes several internal server components (not shown)). This may allow the internal components of the access processing network 150 to communicate with the financial account access module 102 using a local connection rather than using an external connection.

As noted above, the access processing network 150 may include processing platforms for providing clearance for payment transactions. Additionally or alternatively, access processing network 150 may also include other third-party servers, for example, as may be provided by payment processing companies, merchants or any other suitable organization involved in providing access to a financial account. In various embodiments, such third-party servers may also be configured to include financial account access module 102. Alternatively or additionally, such third-party servers may connect to a financial account access module 102 externally hosted on a remote server.

Figure 3E:
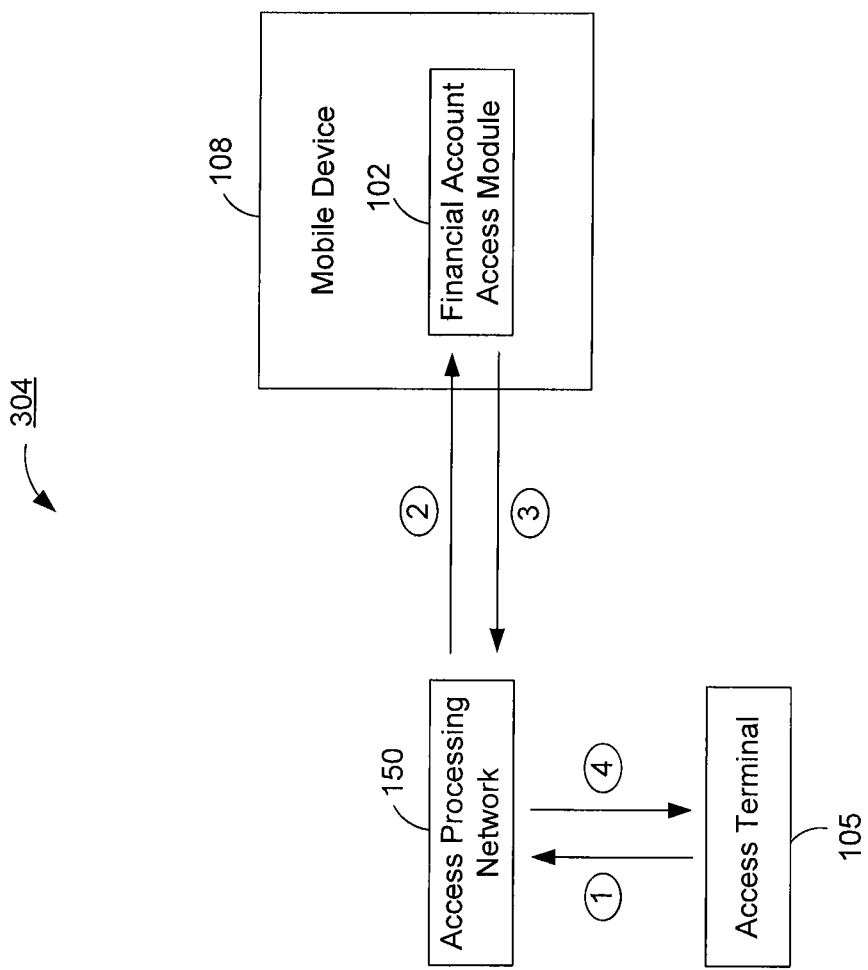

Referring to FIG. 3E, shown there is a schematic diagram, referred to generally as 304, in which the financial account access module 102 can be provided as part of the mobile device 108. For example, this may be in the form of a mobile application that can be installed on the mobile device 108. This configuration may provide enhanced privacy for individuals who would like their transactional data to be stored only on their personal mobile devices 108.

In such embodiment, the authorization request message (message 2) sent to the mobile device 108 may also include: the financial account information (e.g., a key indicator file) used to identify a destination account 140, and/or the access data (e.g., transaction data in a sales transaction) that may be stored in the financial account access module 102. Additionally or alternatively, the identification of a destination account 140 (and the associated mobile device 108) may be performed on the access processing network 150, and message 2 may include (in addition to the authorization request) access data that may be stored in the financial account access module 102. The initial access (payment) request (message 1), response to the authorization request (message 3) and completion of the access (payment) request (message 4) may be completed in a similar fashion as in the configuration illustrated in FIG. 3B (i.e., corresponding to messages 1, 4 and 6 shown in FIG. 3B respectively).

Figure 3F:
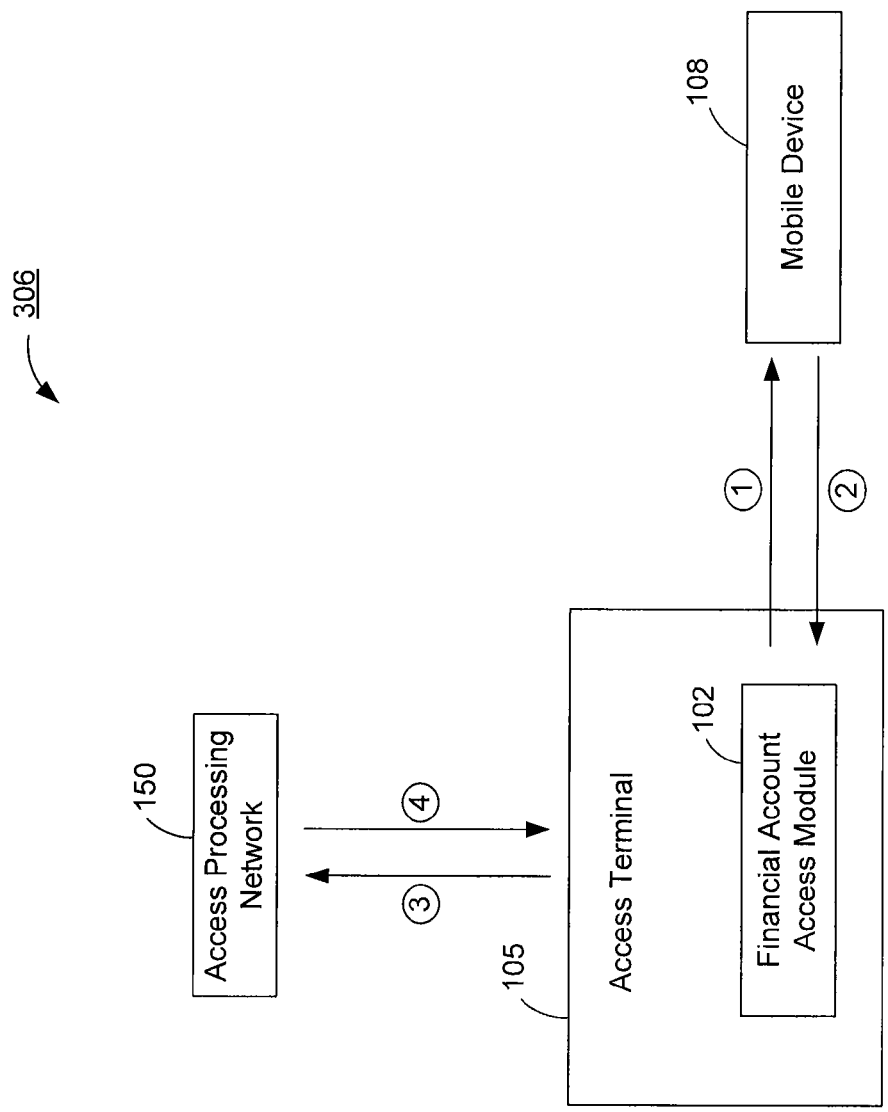

Referring to FIG. 3F, shown there is a schematic diagram, referred to generally as 306, in which the financial account access module 102 can be provided as part of the access terminal 105. In such embodiment, the identification of the destination account 140 (e.g., through a key indicator file) and the storage of access data (e.g., storing the transaction data in a sales transaction) may be performed by the financial account access module 102 embedded in the access terminal 105. Subsequent to the identification of the mobile device 108 associated with the identified destination account 140, an authorization request message (message 1) is sent to the mobile device 108 linked to the destination account 140. A response (message 2) is then sent in by mobile device 108 in reply. If authorization is granted, the second-level of authorization is complete. A request for the first-level of authorization (as discussed above) may then be made to the access processing network 150 (messages 3 and 4).

While the financial account access module 102 has been described as residing on various components (e.g., the access processing network 150, access terminal 105 or the mobile device 108), it should be understood that the various modules and databases of the financial account access module 102 (along with the functionality they provide) can be divided such that they reside on one or more of the described components.

Figure 3G:
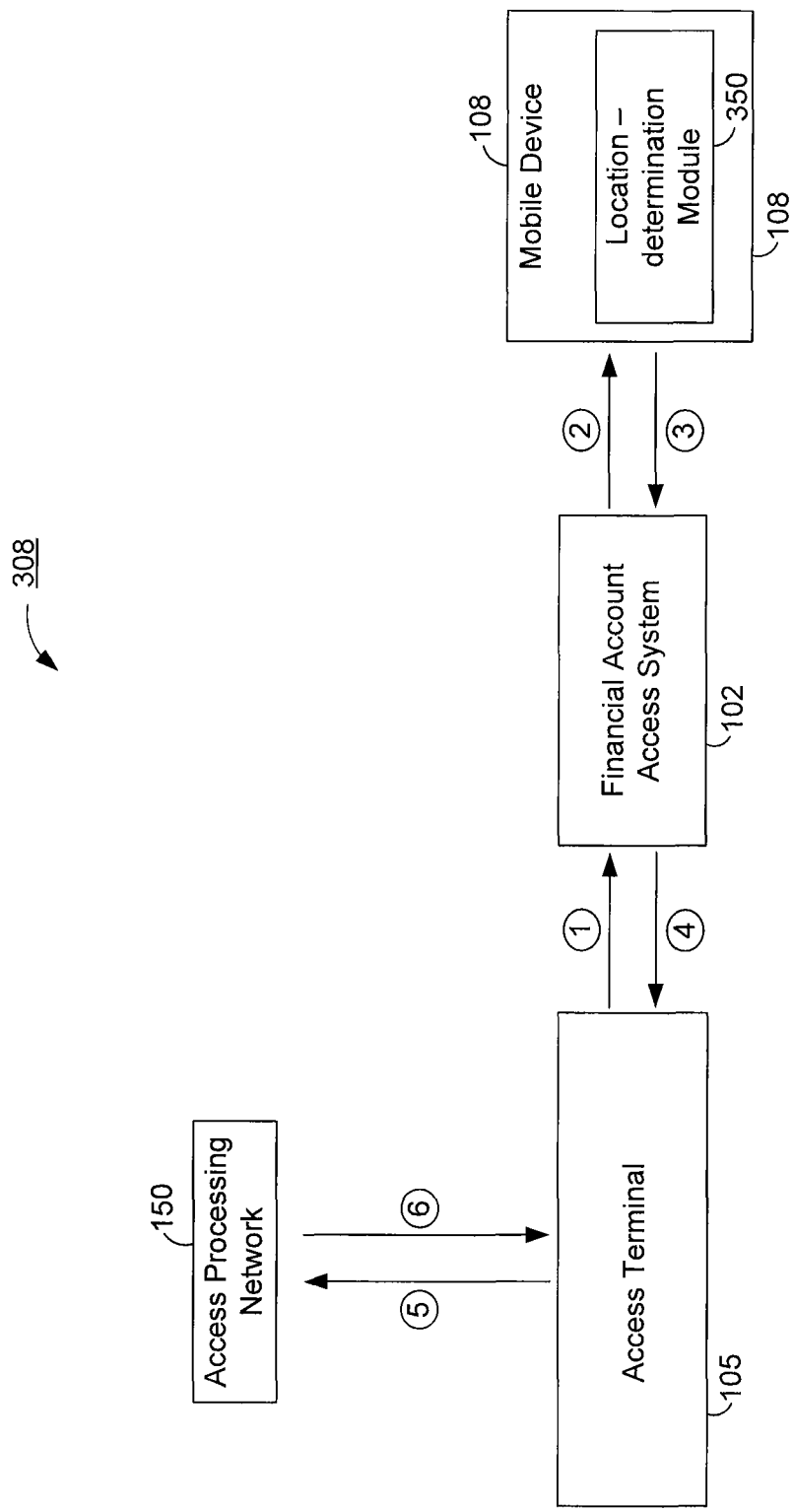

Referring to FIG. 3G, shown there is a schematic illustration of another embodiment, referred to generally as 308, of the sequential flow of messages of a method for controlling access to a financial account. In this embodiment, the authorization request initialization message (message 1) is first sent from the access terminal 105 to the financial account access system 102, which in turn sends the authorization request to the mobile device 108 (message 2). As in earlier message flows, a response message (message 3) may then be sent from the mobile device 108, which is then relayed back to the access terminal 105 (message 4) by the authorization relay module 110 in the financial account access system 102 to complete the second-level of authorization. If the response from the mobile device 108 indicates access should be allowed, then the access terminal 105 may proceed request authorization from the access processing network 150 (messages 5 and 6)

In effect, the embodiment of FIG. 3G performs the second level of authorization before the typical first level of authorization in the access processing network 150. Such embodiment may be advantageous because some access processing networks 150 may have a preset timeout after which, a requested access to the financial account may automatically be denied. The expiration of such timeout may occur if the, for example, a user of the mobile device 108 is distracted and forgets to respond to the authorization request sent by financial account access system 102.

By performing the second level of authorization before the first level of authorization, such accidental denial can be prevented.

Shown also in FIG. 3G is the presence of a location-determination module 350, which is operable to determine the location of the mobile device 108. While only illustrated in FIG. 3G, it will be understood that such location-determination module may also be present in other mobile devices 108 illustrated throughout the various figures of the subject disclosure.

Figure 3H:
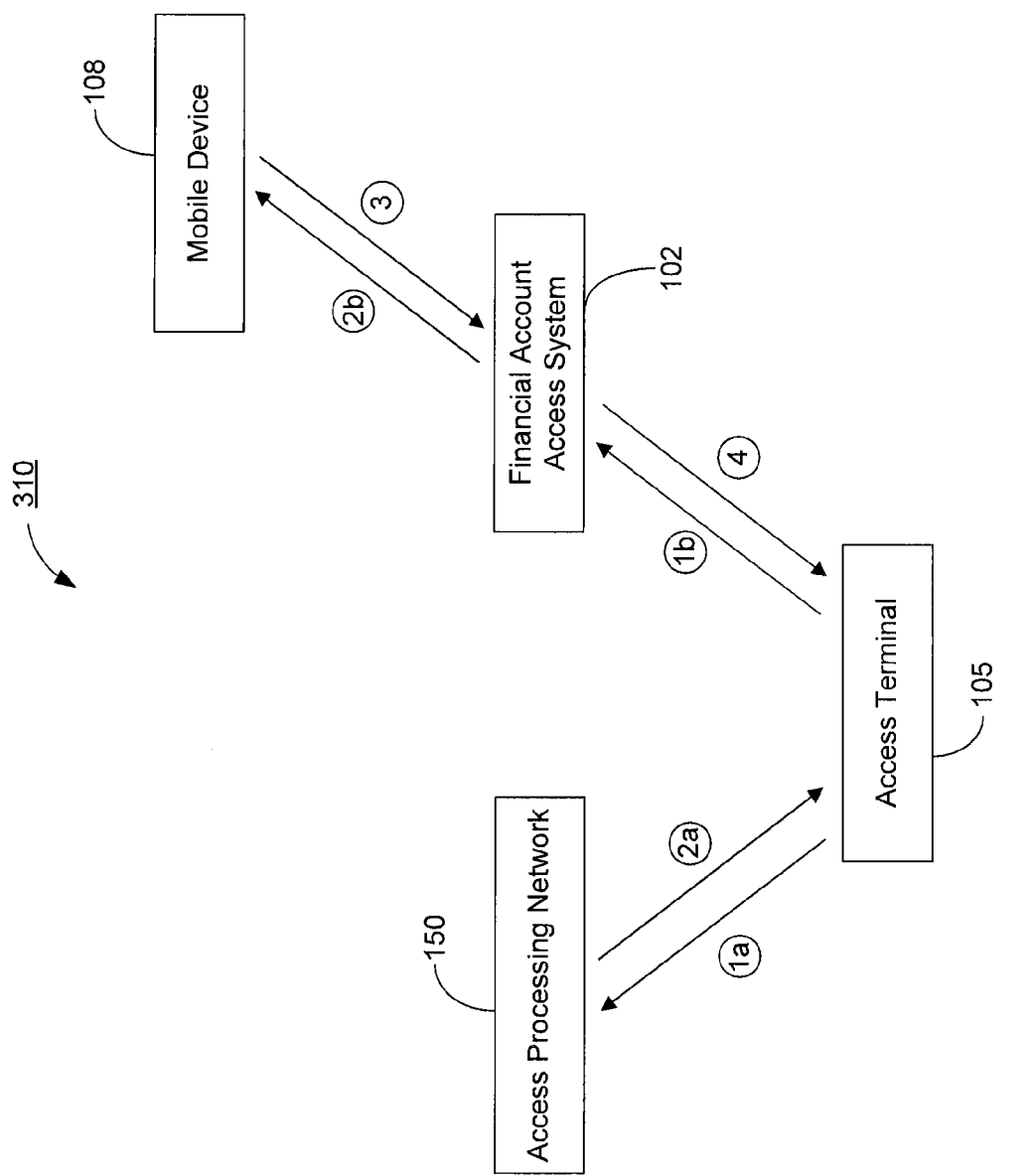

Referring to FIG. 3H, shown there is a schematic illustration, referred to generally as 310, of another embodiment of the sequential flow of messages of a method for controlling access to a financial account. In this embodiment, the access terminal 105 simultaneously sends the payment request message to the access processing network 150 and the authorization request initialization message to the financial account access system 102 (as illustrated by the messages 1a and 1b).

The financial account access system 102 may then send the authorization request to the mobile device 108 and receive a response back (messages 2b and 3), indicating the second-level of authorization. The response can then be relayed to the access terminal 105 (message 4).

Proceeding simultaneous to and independent from the second-level of authorization, the access processing network 150 may perform the first level of authorization and send back the result of such authorization (payment) request to access terminal 105 (message 2a).

For clarity, it will be understood that messages 2a and 2b are labelled 2a and 2b only for the purposes of indicating that they are being sent after messages 1a and 1b respectively. Messages 2a and 2b need not be sent contemporaneously, and in some embodiments, may be sent in one after the other depending on the time it takes for the message 1a and 1b to arrive at their destination. In some embodiments, either the first level of authorization or the second level of authorization may complete before the other.

The access terminal 105 may then allow access to the financial account depending on both the first-level of authorization and the second-level of authorization responses received. In some embodiments, access may only be allowed if both levels of authorization indicate that access should be allowed.

Figure 4A:
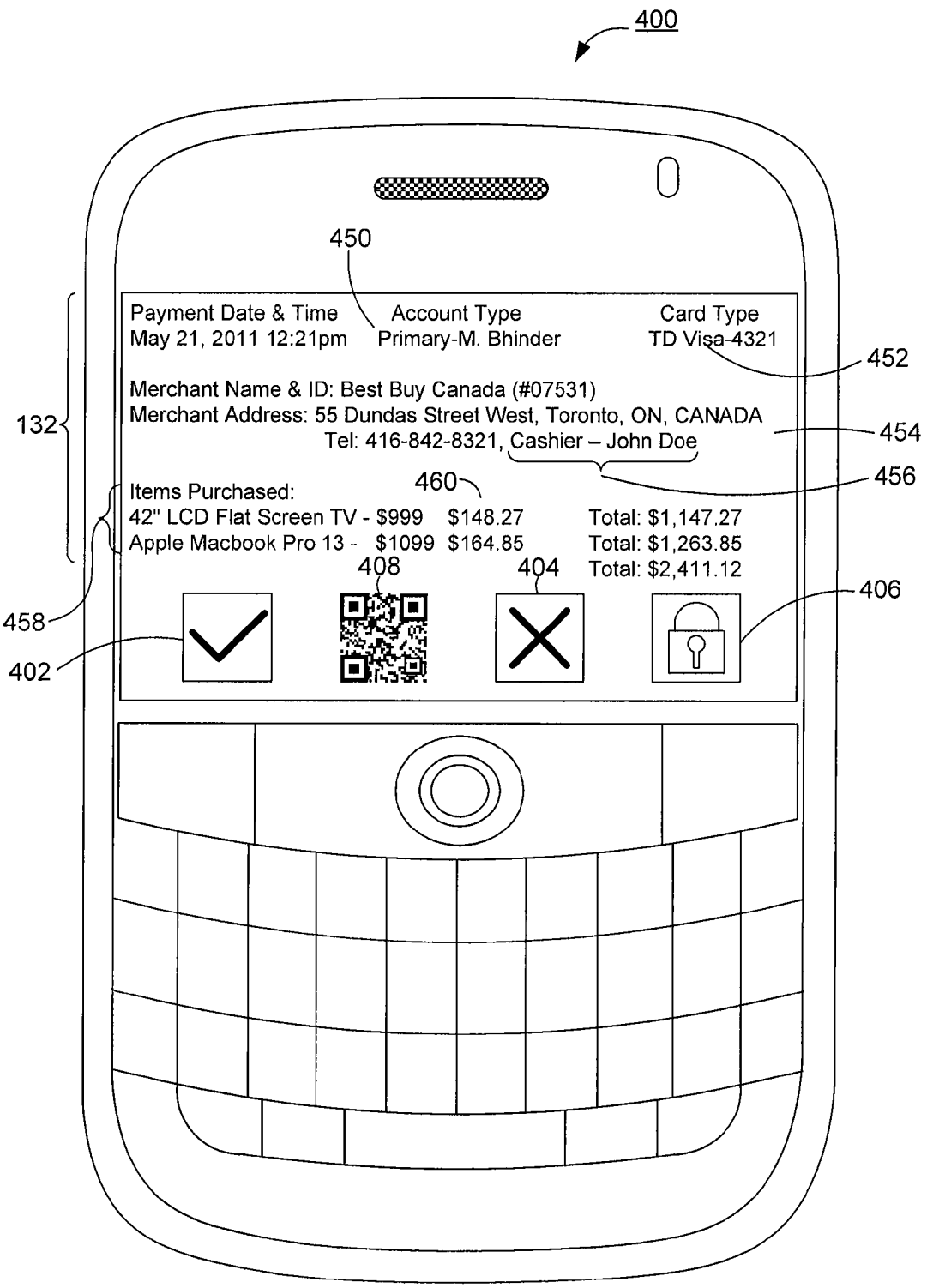
FIGS. 4A and 4B are example screenshots of an authorization request message on a Blackberry® and an iPhone® smartphone respectively.
Figure 4B:
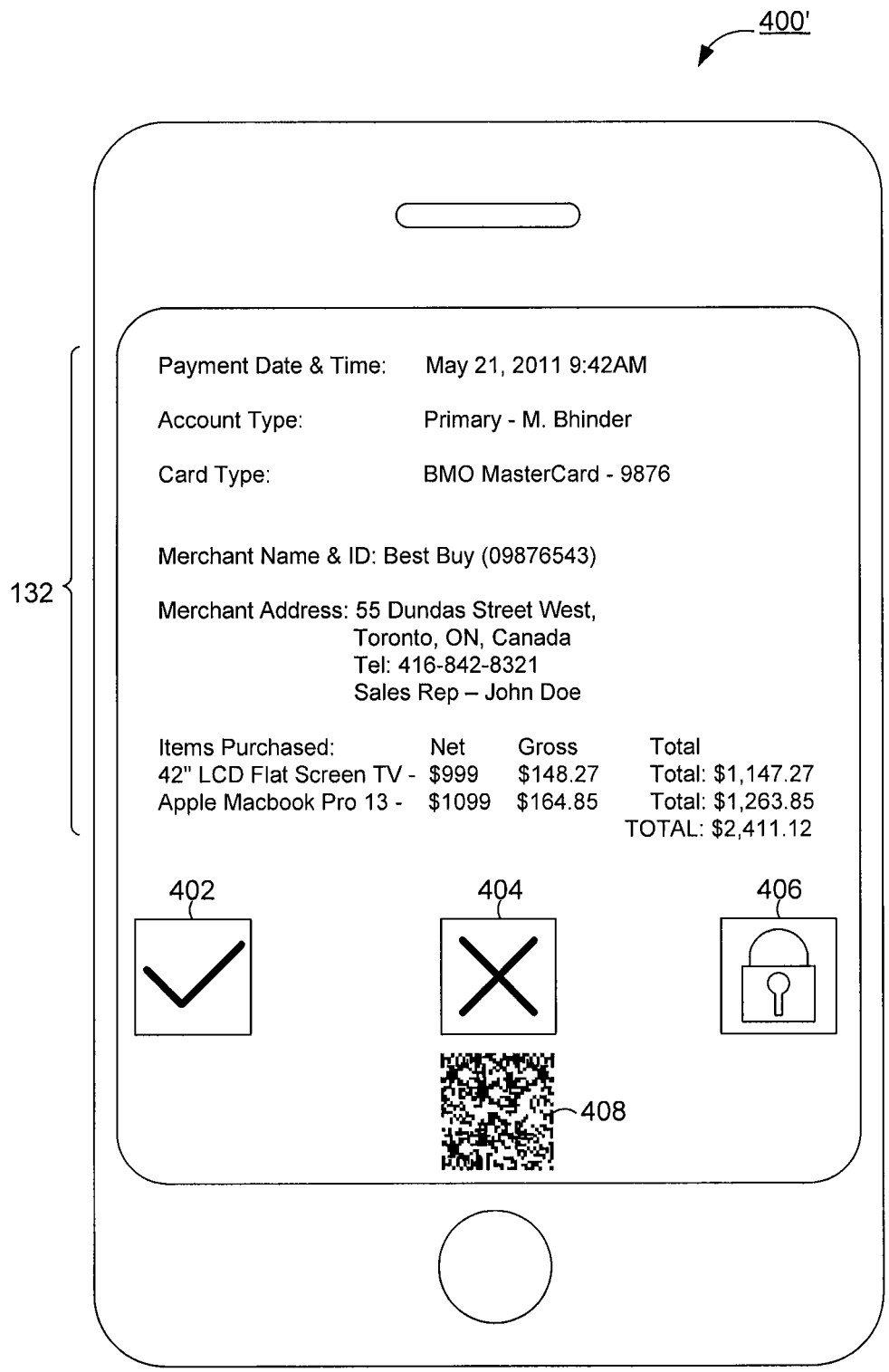

Referring to FIGS. 4A and 4B, therein illustrated are example screenshots of authorization requests on BlackBerry® and iPhone® smartphones 108b, shown generally as 400 and 400' respectively. It will be understood that although the following discussion will be made in reference to FIG. 4A, the same discussion is also applicable to FIG. 4B. In such exemplary embodiment, financial account may be a credit card account being accessed for the purposes of payment for a sales transaction at a retail location. The authorization request may contain an approval option 402 for approving the access, a denial option 404 for denying access, and a lock option 406 for locking the financial account (e.g., the credit card account) to prevent further access to the credit card account. In the case when the lock option is selected, the response may be operable to contain instructions/requests to lock the financial account. The authorization request may also contain access data (in this case, transactional data) 132 which may contain details that may assist the user in deciding how to respond to the authorization request. The authorization request may also be configurable to provide a barcode 408 for representing the transaction details.

As noted earlier, a user may select the approval option 402 to approve the requested access. Approvals may typically be required to enable the release of funds from the financial account. This may involve the sending of an indicator file from the financial account access system 102 to the access processing network 150 to indicate to the one or more of the clearinghouses/acquirers, payment associations and/or issuing institutions to release the requested funds.

In some embodiments, authorization requests may be sent not only to the account holder performing the sales transaction, but may also be provided to any other accounts associated with the destination accounts 140 as described above. For example, a primary account holder may wish to receive an authorization request for transactions being made by supplementary account holder. Such authorization may be alternative or additional to the authorization request received by the supplementary account holder. Such alternative or additional authorization request may provide the primary account holder with greater control over supplementary account holders and the type of expenses incurred, before they are actually incurred. For example, such real-time authorization viewing may be particularly advantageous for employers watching over employees; or, parents watching over their children. Furthermore, even the possibility that an expense may be immediately sent to a primary account holder for authorization may cause supplementary account holders to be more cautious with their spending.

The denial option 404 may be provided for denying the requested access to the financial account access system 102. The ability to deny or decline a transaction is made available as an option to the account holder/cardholder. That is, no funds would have been withdrawn from the payment association or issuing bank as a result of this responsive action.

The benefit of this feature is to allow the account-holder/cardholder to exercise a deny/decline if they decide to cancel their purchase as a last minute decision during the payment process. This feature would be of particular use and benefit to impulsive or indecisive shoppers. This feature would also be of great benefit to the primary accountholder if they opted to be part of the authorization process. Primary accountholders would have greater control on spend management if they felt that their supplementary accountholders were making an unnecessary purchase, by simply declining the transaction(s).

The lock option 406 may be particularly advantageous for stopping all fraudulent access to financial accounts. In addition to being able to deny the immediately fraudulent transaction from taking place, this feature would also prevent any actual loss. The lock option 406 will be able to immediately lock the payment account when an account holder recognizes that this is not their legitimate transaction, but is in fact a fraudulent transaction. In such a fraudulent event, the account-holder simply has to activate the lock option 406 as part of the authorization request. This provides a further benefit so that a potential fraudster may not only succeed in executing any fraudulent transaction(s) but also prevents them from continuing to use the compromised payment card at retail locations or via any e-commerce platforms that are not enabled to seek authorization and/or authentication from financial account access system 102.

To prevent cardholder dissatisfaction, the issuing bank may immediately assign a new card account number to the financial account. Alternatively, the new card number may be dynamically assigned to destination account 140. Such details may be immediately provided to the account holder/cardholder so as to enable the account holder to continue making purchases and not experience any disruptions with using their preferred choice of payment options. While a physical card cannot be sent electronically, card account details may be sent to mobile device in the form of an electronic barcode (not shown) which would contain the properties and values of the newly created dynamic account number. This would allow the cardholder to physically present their mobile device 108 with the newly received barcode (containing the new account number properties and values) to be scanned by the merchants at the access terminal 105. This method would allow immediate continuance of payments and transactions using the mobile device 108 itself. It will be understood that the barcode may be any linear, 2-dimensional or 3-dimensional barcode suitable for storing such data. In such embodiments, access terminal 105 may be provided with a suitable barcode reader/scanner to scan the barcode for the purposes of reading in credit card account details.

This is advantageous over known fraud detection mechanisms which rely on first-level authorization through the channel in which the card information is provided; i.e., an Internet browser for card not present transactions (e.g., e-commerce); of a POS terminal for card present transactions. When such mechanisms fail, losses are often incurred by the issuing bank or payment association because they often have policies to cover losses stemming from fraudulent transactions so as not to discourage cardholders from not using their cards. Such losses may never arise in view of the subject embodiment's ability to deny a transaction or lock an account before any funds are paid. As noted above, to encourage the adoption of the subject embodiment (so as to reduce losses), issuing banks or payment associations (e.g., Visa®, MasterCard®, etc.) may not extend coverage for losses resulting from fraudulent transactions to cardholders who do not adopt the usage of the financial account access system 102.

In the embodiment in which financial account access system 102 may also operate as an electronic receipt system, detailed transactional data 132 may be collected and provided in the authorization request. Providing such detailed transactional data 132 in the authorization may be particularly advantageous in providing the context for the approval or denial of a transaction, or the locking of an account associated with the transaction. For example, detailed transactional data may contain an itemized listing of the purchased items 458 and a breakdown of associated fees or taxes 460. Such information may be particularly useful for identifying mistaken, erroneous or hidden items before final approval of a legitimate transaction.

In some embodiments, such transactional data may be captured in a barcode 408. Such barcode may be particularly advantageous for quickly identifying the transaction at a POS terminal 105 if there is a dispute as to the contents of the transaction in the transactional details 458. That is, the merchant may be able to scan the barcode to process bring up the outstanding transaction at the access terminal 105 in a quicker and less error-prone way than for example, manually entering a transaction number. It will be understood that the barcode may be any linear, 2-dimensional or 3-dimensional barcode suitable for storing such data. In such embodiments, access terminal 105 may be provided with a suitable barcode reader/scanner to scan the barcode version of the barcode 408 for reading financial transaction data associated with a transaction. In further embodiments, the barcode 408 may form the electronic receipt 130 after a transaction has completed, and additionally or alternatively contain a reference to the electronic receipt 130 stored on the electronic receipt system. This reference may enable additional financial transaction data 132 not captured in the barcode to be accessed at the point-of-sale environment 105 when the barcode is scanned.

In effect, providing the transactional details in this manner in the authorization request provides a preview of the receipt that may be generated before the transaction is completed. Such details may be helpful in retail transactions where such detail may not be easily accessible before the transaction completes, such as in a crowded convenience store where a patron may be purchasing numerous items. The denial option 404 of the authorization request may be selected if there is disagreement or discrepancies with what is shown on the authorization request.

As a further example, consider a patron at a bar opening a tab for beverages on a payment card registered with financial account access system 102. At the end of the night, when paying off the tab, such patron may be provided with an authorization request outlining detailed transactional data including itemized listing beverages for which the patron is being charged. If the patron disagrees with any of the charges, he or she may immediately deny the transaction and not allow it to go through.

Moreover, in retail environments where value added taxes or fees are included in the retail price (e.g., VAT taxes in the United Kingdom, or gasoline taxes in certain Canadian provinces), such detailed transaction information may provide for greater transparency and clarity as to the makeup of costs of a given purchase. In view of these transactional details, a potential buyer may be able to deny the transaction and seek alternate vendors for which a specified fee may be lower or, seek alternate jurisdictions where taxes may be lower (if a purchase is of a sufficiently large amount).

Detailed financial transactional data 132 may also comprise payment card information 452, geographical location of the transaction 454, the cashier at the transaction 456 and/or other miscellaneous financial transaction details that may be captured in the different levels of the merchant level data as specified above.

Particularly, the geographical location of the transaction 454 may be advantageous for identifying fraudulent transactions. That is, if the account holder receives an authorization request when they have not tried to access their payment card, and the transaction details of the authorization request indicate that it is coming from a geographical location where they are not physically present, it indicates that a fraudulent transaction may be taking place. The account holder can accordingly select the lock option 406 to prevent further access to the compromised account. As noted above, new account information may be assigned to allow a user to continue shopping. Such new account number may be formatted as a barcode.

Additionally, the location fields from numerous fraudulent transactions may be collected and analyzed by financial account access system 102 to help determine where fraudulent transactions are likely to take place. This may help to identify potentially compromised access terminals 105, or to aid law enforcement officials in apprehending fraudsters.

As noted earlier, in one embodiment, the amount of transactional data 132 present in the authorization request may be variable depending on the type of destination account 140 (e.g., consumer or business manager) that is linked to the payment card. For example, a consumer may want less transactional detail so as to simplify the display to indicate only the total amount, whereas a business manager may want more merchant level data fields to inform the business manager of the details of the access request.

In other embodiments, the amount of transactional data 132 appearing on the authorization request may be configured according to an account holder's preference, which may be selectable via the destination account 140.

In some embodiments, the transactional details shown in the authorization request may be configured to show transactional details from historical transactions of a similar nature to provide indications of any changes in price that may not be readily apparent during the sales transaction. Such information may increase transparency in pricing information as such historical transactional information may not be readily accessible at the time or location where the sales transaction is taking place. In a further embodiment, the authorization request may be configured to indicate differences in prices (not shown) for particular items appearing on both the transactional details of the requested transaction as well as the transactional details in the historical transactions.

For example, a business manager may have a recurring vendor payment that is paid on a regular time interval for a batch of supplies or services. If such recurring payment is registered with financial account access system 102, when payment is due for a given period, both the transactional details of the current period, and of the previous period may be provided in the authorization request. This provision of historical transactional data before payment is processed may allow business managers to better understand the direction of movement for their costs, i.e., whether costs for a given supply or service is increasing or decreasing. In view of an unexpected increase, the business manager may be able to select the denial option 404 on the authorization request, and contact the vendor for an explanation in the increase.

The provision of historical transactional details in conjunction with the transactional details of a current transaction in an authorization request may be advantageous for consumers also.

For example, if a consumer frequently visits a coffee shop and orders the same items, price increases may be easily seen on the authorization request. Such real-time indication of historical prices may be advantageous for purchasers to flag any increases in prices, fees or taxes that may otherwise go unperceived, especially if the increases are small. The introduction of historical transactional information thus helps to increases transparency in sales transactions.

As a further example, a consumer making a withdrawal from a bank account may also be presented with detailed access data concerning the fees that may be charged on the authorization request before the withdrawal is allowed. Changes in such bank or ATM fees or activities from historical transactions may be easily seen by receivers of authorization requests, thereby increasing the transparency of bank account withdrawals. The viewing of historical withdrawals may also be helpful for destination account holders to control their spending (e.g., seeing the amount of money already withdrawn within a week or month). Also, the viewing of such historical withdrawals before performing withdrawals may aid fraud capture if primary account holders receive authorization requests for withdrawals that are out of pattern of typical withdrawals performed by their supplementary account holders.

Figure 5:
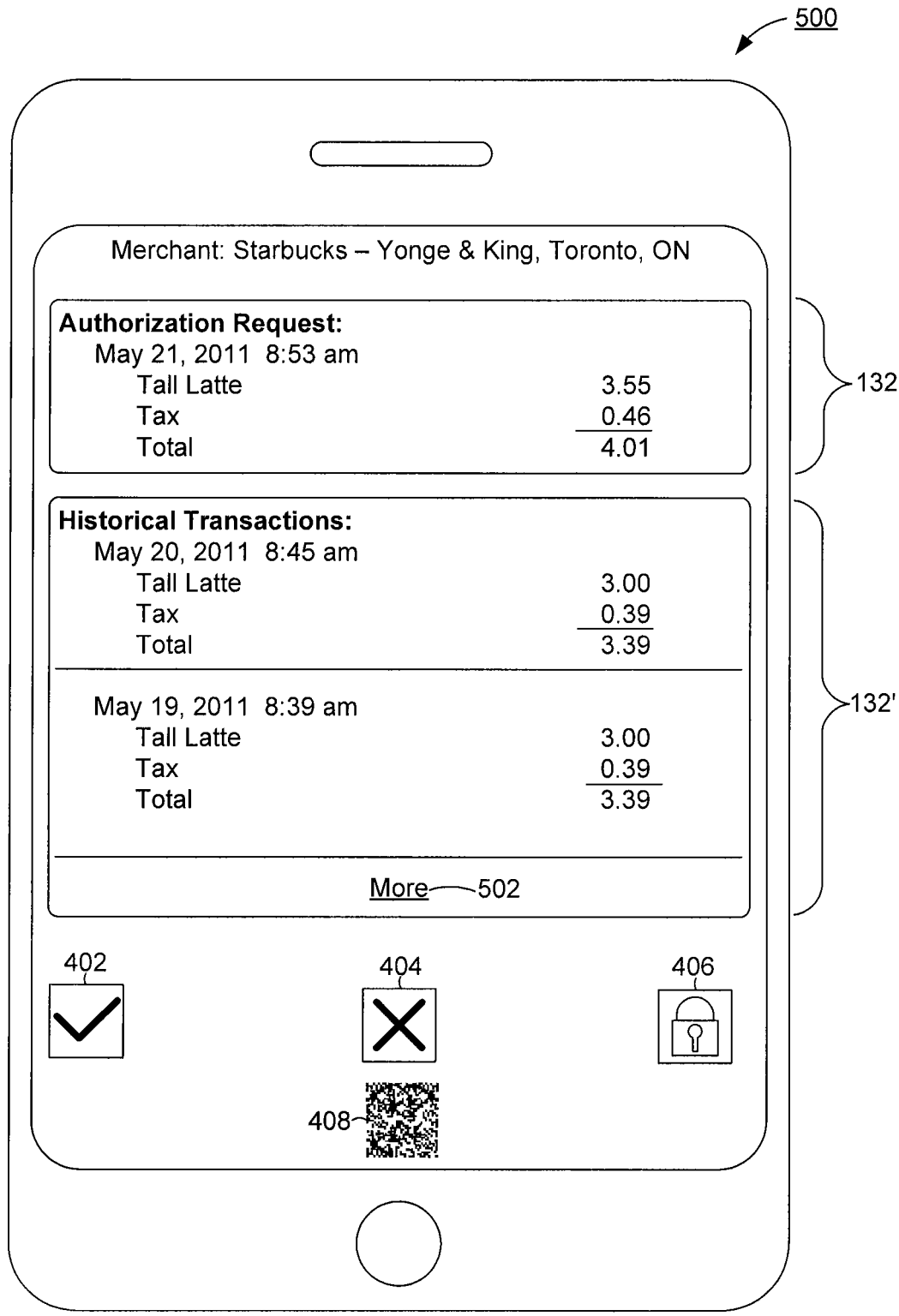
FIG. 5 is an example screenshot of an authorization request with historical transaction data.

Referring to FIG. 5, therein illustrated is an example screenshot illustrating an authorization request containing transactional data of a payment request along with historical transactional data, shown generally as 500. Similar to authorization requests shown above, the authorization request may include an approval option 402, a denial option 404 and a lock option 406. A barcode indicating the transactional details 408 may also be provided. In addition to providing transactional details 132 pertaining to the immediate request being made, the authorization request may further contain historical transactional data 132' indicating pricing in similar transactions in the past. The example screenshot illustrates an increase in the price of a tall latte from $3.00 to $3.55 at a Starbucks coffee shop from May 20, 2011 to May 21, 2011. If a user wishes to see additional historical transactional details, the authorization request may be operable to provide a 'more' option 502 to show further historical transactional details.

It will be understood that the historical transactions may be configured according to the frequency of the recurring transaction registered. Some transactions may recur on a weekly, bi-weekly, monthly, bimonthly, or yearly basis such that for particularly lengthy time intervals between transactions, the historical details may be particularly helpful in acting as a reminder as to the prices of historical transactions. The historical transactions shown may be for any such periods. In further embodiments, analysis may be performed on the figures in the historical transactions to show summary information; for example, total amounts spent, an average price or a percentage increase in a given timeframe. Such additional information may provide further context into whether an account holder presented with the authorization request may want to allow or deny the transaction.

Figure 6:
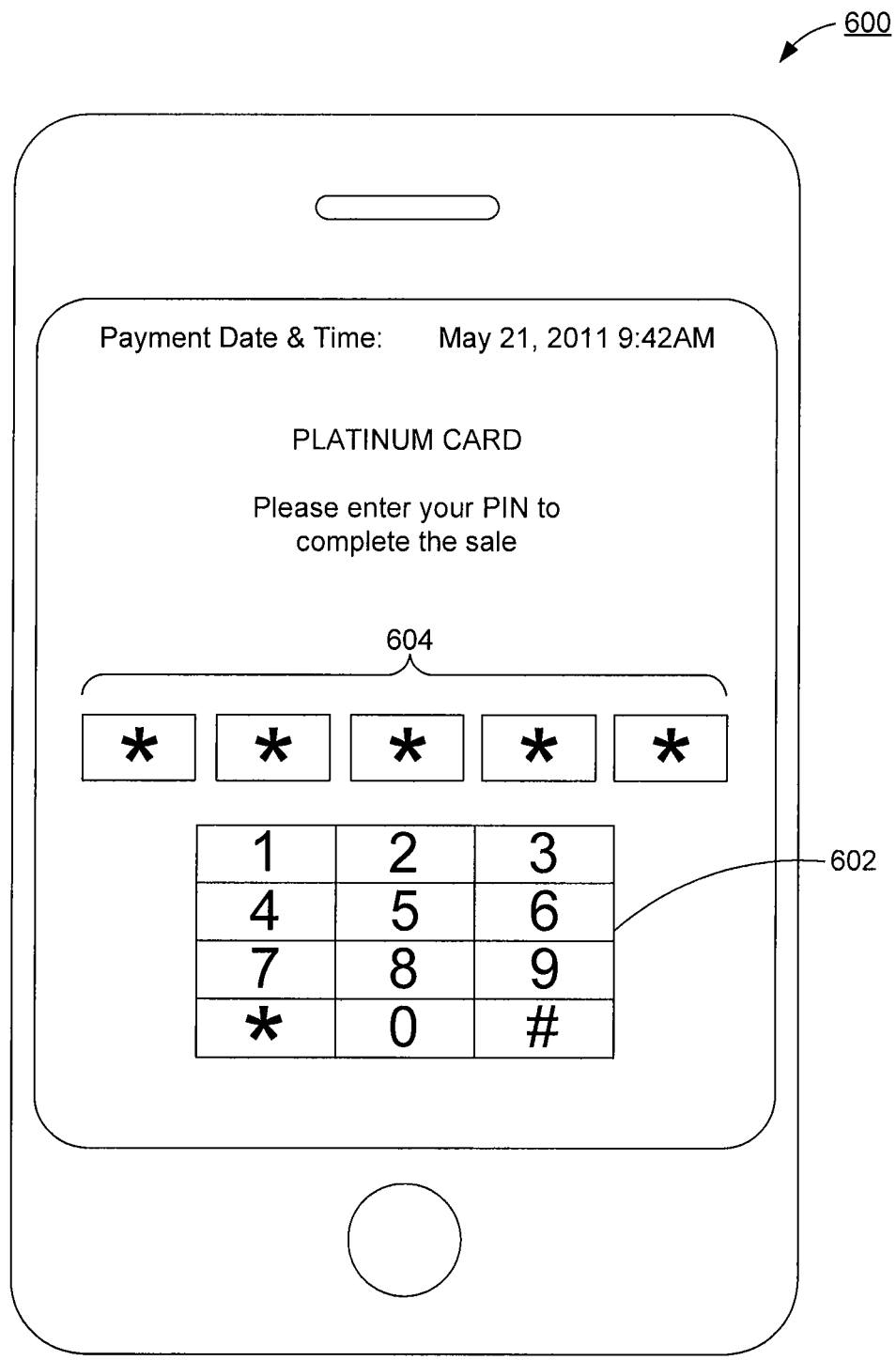
FIG. 6 is an example screenshot of an embodiment in which the authorization request message allows for PIN code authentication of the payment card holder to be entered.

Referring to FIG. 6, therein illustrated is an example embodiment in which the mobile device 108 may used as a PIN pad for authentication purposes, shown generally as 600. In such embodiment, a PIN pad 602 may be provided, and hidden keypad entries 604 (shown as '*') may be provided to indicate that that numbers have been entered on the PIN pad 602. As noted above, financial account access system 102 may verify the entered PIN by sending an indicator file of the PIN (e.g., an encrypted hashed value of the PIN) to the access (payment) processing network 150 for verification. Additionally or alternatively, authentication module 112 may already have an indicator file for the PIN stored on financial account access system 102 for verification at the financial account access system 102. In a further embodiment, such indicator file may be sent along with the authorization request from the financial account system 102 so that PIN validation may occur at the mobile device 108.

Having discussed various aspects of the operation of financial account access system 102, discussion now moves to initial setup that may be required to allow such system to operate.

During the account setup stage, subscribing owners of access terminals 105 may be able to download, integrate and install specialized software forming on access terminal 105. This may be done at ATMs, Point of Sale (POS) environments, or e-commerce environments. As described above, once installed, access terminal 105 may be operable to capture financial transaction data 132 for providing in authorization requests.

Before financial access system 102 may be used by buyers to receive authorization requests, they may need to create an online destination account 140 on the financial account access system 102. During the account creation process, account holders may need to provide a unique identifier and password for their destination account so as to be securely access their account and receipts.

When creating accounts, buyers may be required to provide personal background information and additional predetermined key data elements that may allow for payment of funds via payment methods that require access to access processing networks 150. Such data elements may also include mobile device 108 identification information so as to enable mobile devices 108 to receive authorization requests. Such account creation may occur through Internet websites provided by financial access system 102, or immediately at the access terminal 105 for a non-subscribing buyer. The latter scenario may arise if a non-subscribing buyer makes a purchase at sales terminal 105.

Figure 7:
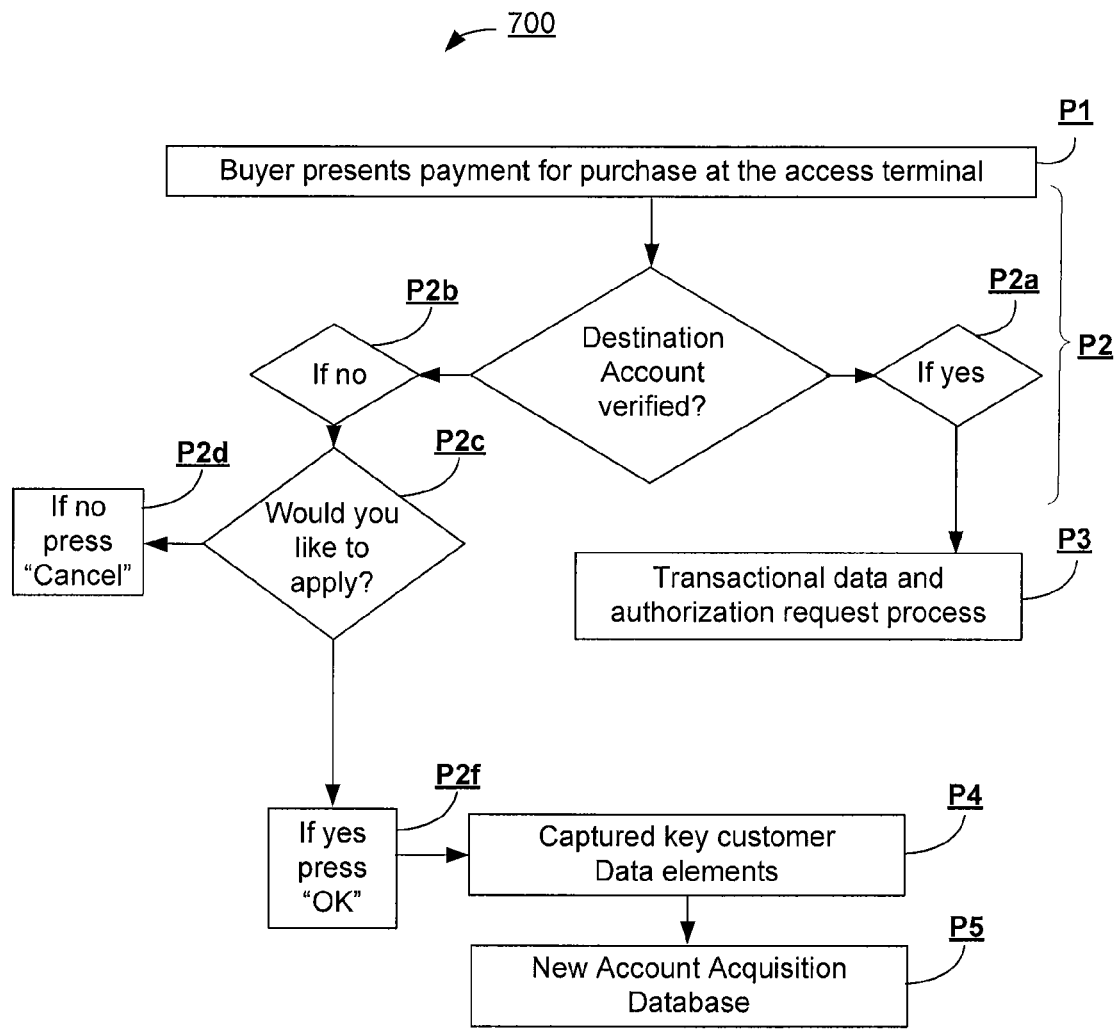
FIG. 7 is a flowchart diagram illustrating the steps of creating a new account at the access terminal.

Referring to FIG. 7, therein illustrated is a flowchart diagram illustrating the steps of acquiring a new registered buyer at a sales terminal 105, shown generally as 700.

At P1, a buyer presents payment for purchase at the sales terminal 105. At P2, account identification module 170 (as shown in FIG. 1) attempts to determine if the buyer is associated with a destination account 140. If account identification module 170 recognizes a destination account 140 (P2a), the transactional data and authorization request process proceeds as per described in FIG. 2.

If, however, account identification module 170 (as shown in FIG. 1) does not recognize the subscribing buyer as being associated with a destination account 140, it may automatically assume the buyer is a non-subscriber.

That is, if the account identification module 170 (as shown in FIG. 1), detects that the buyer is not a subscriber (P2b), it will begin the process of asking if the prospect would like to apply (P2c). If the prospect provides a response claiming "No" (P2d), then sales terminal 105 would allow the financial transaction to take place without the capturing of financial transactional data 132 and sending of authorization requests by financial account access system 102.

If the prospect provides a response claiming "Yes" (P2f), access terminal 105 may be operable to capture key data elements from the prospect's key customer data elements, typically including payment information details and mobile device 108 identification information (P4). Upon capturing, the data will then be transmitted to a secure new account acquisition database (not shown in FIG. 1) (P5), in real-time.

Since the invention may identify non-subscribing buyers at the access terminal 105, this may drive the opportunity of growing new acquisition of subscribing buyers to financial account access system 102, directly from the frontline. Whenever the account recognition module 170 (as shown in FIG. 1) does not identify a subscriber, it may automatically assume that the person is a non-subscriber and will prompt the person through a message via the access terminal 105 or via the e-Commerce platforms if they would like to subscribe to the financial account access system 102 to receive authorization requests. If the prospect would like to begin receiving authorization requests, they will follow some basic steps directed on the access terminal 105 to show acknowledgment and to provide their consent in allowing the access terminal 105 to collect some key data elements from their method of payment/EBPP (Electronic Bill Presentment and Payment), and mobile device 108 identification information. By retrieving their data elements the financial account access system 102 may engage in steps to create and set-up an account for the new subscribing buyer In such embodiment, access terminal 105 may be provided with suitable hardware components for entering the key data elements required for account creation. Such hardware components may be provided in the form of a numeric keypad, a mini keyboard or touch screen terminal. As noted, during such account creation, access terminal 105 may request mobile device 108 identification information so as to enable the sending of authorization requests to the identified mobile device 108. Such identification information may include a mobile phone number, an email address linked with a mobile device, or an identification number associated with the mobile device (e.g., a BlackBerry® PIN).

Figure 8:
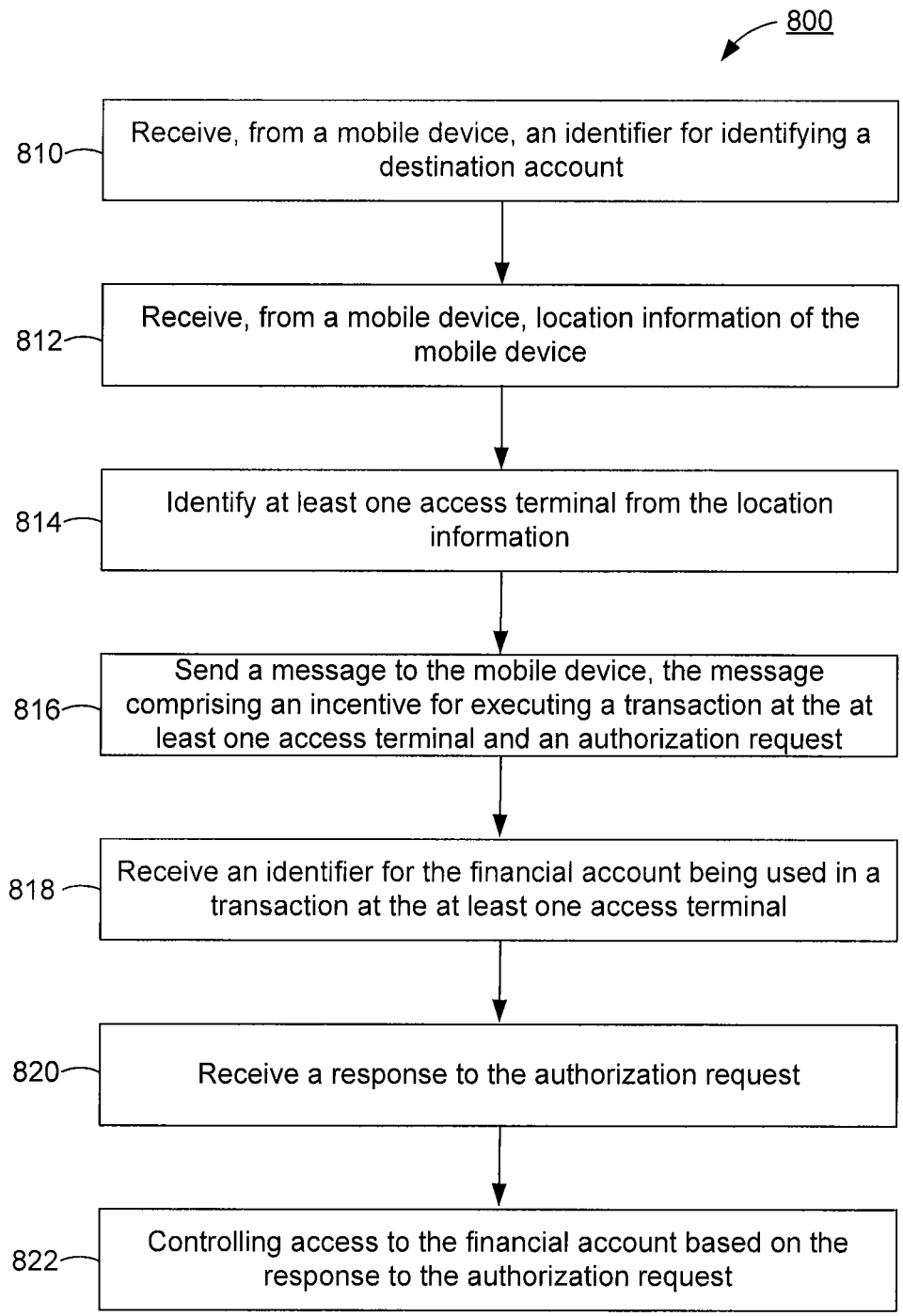
FIG. 8 is a flowchart diagram illustrating the steps of controlling access to a financial account, in accordance with an embodiment of the present disclosure.

Referring to FIG. 8, shown there generally as 800, is a flowchart diagram illustrating the steps of controlling access to a financial account, in accordance with an embodiment of the present disclosure.

At step 810, the financial account access system 102 may receive, from a mobile device 108, an identifier for a destination account 140. The identifier may be login information for a destination account 140 stored in account database 124. In some embodiments, the login information may originate from an application running on the mobile device 108. As discussed above, the destination account 140 may be associated with one or more financial accounts.

At step 812, the financial account access system 102 may receive location information from the mobile device 108. The location information may be indicated by a location-determination module (e.g., a GPS antenna) embedded in the mobile device 108 (An example of such a location-determination module 350 is shown in FIG. 3G).

At step 814, the financial account access system 102 may be operable to identify at least one access terminal 105 from the location information sent from the mobile device 108. It may do so by referencing the incentive database 126 which may store information about access terminals 105 and their respective locations. The financial account access system 102 may be operable to identify the at least one access terminal 105 to be within a configurable distance of the location provided by the mobile device 108. In some embodiments, the access terminal 105 may be associated with at least one merchant.

At step 816, the financial account access system 102 sends a message to the mobile device 108, the message including: an incentive for executing a transaction at the at least one access terminal 105, and an authorization request.

As discussed above, in the case where the access terminal 105 is associated with a merchant, the incentive may be a discount, coupon or promotion that is intended to entice a potential shopper to make a purchase at the merchant. In another embodiment, the incentive may be a contest where a user receives an entry for conducting a transaction at an access terminal 105. This may, for example, be the case if the access terminal 105 is an Automated Teller Machine (ATM), and a banking institution is operating a contest to encourage use of ATMs instead of tellers.

The authorization request may be requesting access to a default financial account associated with the destination account 140 identified by the owner of the destination account 140 as typically being used when redeeming incentives. In some embodiments, the authorization request may be for a pre-selected number of the financial accounts associated with the destination account 140 identified by the user as typically used when redeeming incentives. In further embodiments, the authorization request may be for all the financial accounts associated with the destination account 140.

The authorization request sent with the incentive may be hidden or shown to the user. In the case where it is hidden, the act of redeeming the incentive at the access terminal 105 may constitute accepting the authorization request if the identifier for the financial account discussed in step 818 corresponds to the financial account for which the authorization request is associated. In the case where the authorization request is shown, an explicit message may be displayed to the user to inform him/her that by redeeming the incentive, they are authorizing access to a financial account that the user may have indicated as typically being used for redeeming incentives.

The message including the incentive and the authorization request may be in the form of a barcode and/or a serial number that may be identified by the access terminal 105.

Figure 9:
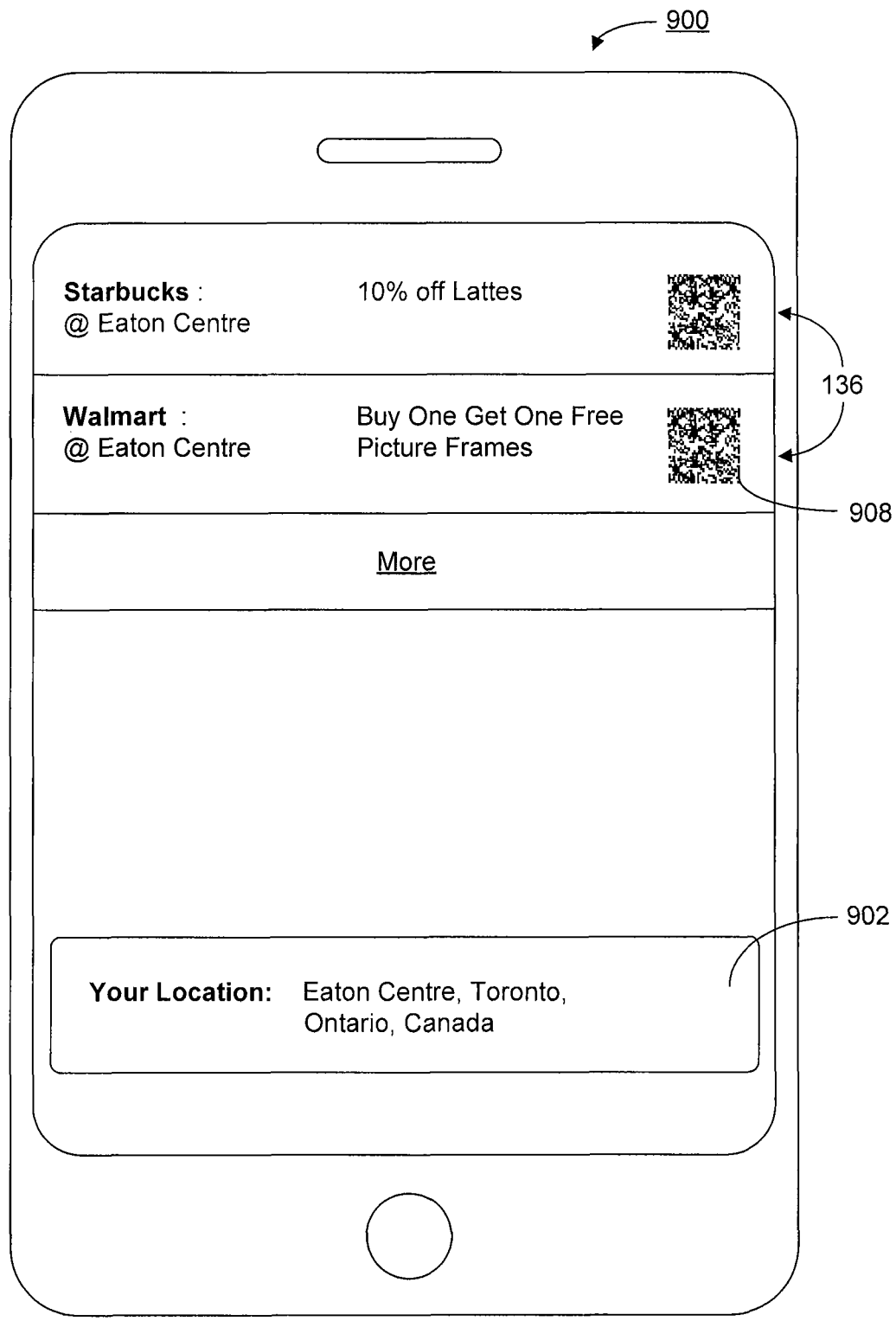
FIG. 9 is an example screenshot of a message including an incentive for executing a transaction and an authorization request sent to a mobile device.

Referring simultaneously to FIG. 9, shown there generally as 900, is an example screenshot of a message including an incentive for executing a transaction and an authorization request sent to a mobile device 108. As illustrated, the mobile device 108 may determine its location 902 from the location-determination module 305 to be the 'Eaton Centre' mall in 'Toronto, Ontario Canada'. From the location of the mobile device 108, one or more locations of access terminals 105 that are associated with merchants may be identified to be near the location of the mobile device 108. These merchants may have incentives 136 available to encourage a transaction at the merchant. For example, these may include '10% off Lattes' at a Starbucks® coffee merchant and 'Buy One Get One free Pictures Frames' at a Walmart® merchant. To redeem such incentives, the user of the mobile device 108 may, for example, present a barcode 908 at an access terminal 105 located at each of these stores.

At step 818, the financial account access system 102 can receive an identifier for the financial account that is being used in a transaction at the at least one access terminal 105 located at step 814. In some embodiments, the identified financial account may be the payment account (e.g., a credit or debit card account) used in the transaction when redeeming an incentive sent at step 816. The financial account may typically be associated with the destination account 140 for which the authorization request in step 816 was sent. In the example presented in FIG. 9, a user may present a credit card associated with a destination account 140 for redeeming incentives at the Starbucks® location at the 'Eaton Centre' mall to purchase a latte and redeem the received promotion.

At step 820, the financial account access system 102 receives a response to the authorization request in the message discussed at step 816. As noted, in some embodiments, the act of redeeming the incentive at the access terminal 105 may constitute responding to the authorization request. That is, if the financial account access system 102 is embedded in the access terminal 105 as a module (e.g., as illustrated in FIG. 3F), the financial account access system 102 may treat the redemption of the incentive at the access terminal 105 (e.g., in the example of FIG. 9, the scanning of a barcode 908 at a Starbucks® location at the 'Eaton Centre' mall) as indicating approval to access the financial account indicated in steps 816 and 818. In some embodiments, if the financial account access system 102 is not embedded in the access terminal 105, the redemption of the incentive may trigger the sending of the response to the authorization request from the access terminal 105 to the financial account access system 102.

Additionally or alternatively, the response may be sent with the identifier for the financial account sent in step 818. In such embodiment, the incentive indicator (e.g., a barcode 908 in FIG. 9) may also encompass the identifier for the financial account such that when scanned, no separate presentation of financial account identity information is required. That is, both the nature of the incentive and the identity of the financial account to be used in the transaction can be identified from the scanning of the barcode. In this case, the financial account used in the incentive indicator may be a default financial account associated with the destination account 140 indicated by the user as typically used when redeeming incentives.

At step 822, access to the financial account based on the response to the authorization request. This control constitutes the second level of authorization discussed above. If access is allowed, the first level of authorization may proceed by sending a request to the access processing network 150.

The embodiment of FIG. 8 may be advantageous, for example, in avoiding delay when sending the authorization request for the second level of authorization. As discussed above with regards to FIG. 3G, some access processing networks 150 may be configured to time out if a transaction is not completed within a typically short period of time (e.g., 60 seconds). As such, it may be possible that for such access processing networks 150, that an accidental denial of access may result because the user has taken longer than expected (i.e., timed-out) to respond to the authorization request sent to the mobile device 108 (e.g., if the user was in the middle of a conversation while making a payment at an access terminal 105).

By sending the authorization request in an initial message with an incentive to conduct a transaction, the redeeming of the incentive completes the second level authorization while allowing the first level of authorization to proceed without the potential time constraint of waiting for the user to respond to the authorization request at the mobile device 108.

Security can be enhanced due to the location awareness of the authorization request being sent. That is, because messages having both an incentive and an authorization request (as discussed in step 816) will typically be sent for locations of access terminals 105 which the mobile device 108 is determined to be near, both approval from the mobile device 108 and an identifier for the financial account may still be required before access to a financial account would be allowed.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

I claim:

1. A method for managing access to a financial account over a communications network, the method comprising:
receiving, at a financial account access computer server over the communications network, transaction data in respect of a transaction initiated at an access terminal from one of the access terminal and an access processing network, the access processing network comprising one or more computing platforms for processing transactions, the financial account access computer server comprising a processor and an account database that stores user account data related to one or more financial accounts and account type data related to one or more account types, wherein each account type is assigned a different subset of data fields from a set of data fields defined for the transaction data, wherein the processor:
identifies a user account at the financial account access computer server using the received transaction data, the user account being linked to a user of the financial account access computer server with authority to release funds from the financial account;
identifies an account type of the user account by parsing the user account data stored in the account database in respect of the identified user account;
determines, from the account database, a subset of data fields assigned to the identified account type;
selects a subset of transaction data from the received transaction data according to the determined subset of data fields;
generates an authorization request message with the selected subset of transaction data;
transmits the authorization request message to a mobile device identified by the user account, the authorization request message causing a display on the mobile device to prompt an access response from the user;
receives the access response from the user via the mobile device; and
transmits the access response to an the access processing network over the communications network, wherein the access response activates the access processing network to complete an authorization process in respect of the financial account to control access to the financial account based on the access response, wherein the authorization process involves:
a first-level authorization process determinative at least based on the transaction data, the access response activating the access processing network to conduct the first-level authorization process, the first-level authorization process involving:
operating the access processing network to obtain authorization for the transaction from a transaction processing institution associated with the financial account, the transaction processing institution determining whether to authorize the transaction using the transaction data; and
a second-level authorization process determinative based on the access response received from the mobile device, the second-level authorization process involving:
operating the access processing network to determine from the access response whether to grant access to the financial account; and
in response to determining that the access response grants access to the financial account, indicate the second-level authorization process grants access to the financial account.

2. The method of claim 1, wherein the access response activates the access processing network to:
in response to determining the access response grants access to the financial account, grant access to the financial account if the first-level authorization grants access to the financial account and if the first-level authorization denies access to the financial account, deny access to the financial account, otherwise, operate in accordance with the access response.

3. The method of claim 1, wherein the processor initiates a communication link with the access processing network for transmitting the access response in response to receiving the access response from the mobile device.

4. The method of claim 1, wherein:
the transaction data comprises an indicator file representing the user account at the financial account access computer server for the user; and
identifying the user account at the financial account access computer server using the received transaction data comprises deriving a user account identifier from the indicator file.

5. The method of claim 4, wherein the indicator file comprises a hash value representing the user account identifier of the user account.

6. The method of claim 1, wherein identifying the user account at the financial account access computer server using the received transaction data comprises:
deriving a user account identifier of the user account by comparing at least a portion of the received transaction data with the stored user account data.

7. The method of claim 1, wherein the access response comprises one of an approval message indicating the user has granted access to the financial account for completing the transaction, a denial message indicating the user has denied access to the financial account for completing the transaction, and an access lock message indicating the user has blocked access to the financial account.

8. The method of claim 1, wherein the authorization request message comprises one or more of: an approval option for receiving a user input indicating the user has granted access to the financial account for completing the transaction, a denial option for receiving a user input indicating the user has denied access to the financial account for completing the transaction, an access lock option for receiving a user input indicating the user has blocked access to the financial account, and a contact option for receiving a user input triggering a communication link between the user and a financial institution providing the financial account.

9. The method of claim 1, wherein the access response comprises a biometric authentication input received from the user via the mobile device.

10. A financial account access computer system for managing access to a financial account over a communications network, the system comprising:
an account database that stores user account data related to one or more financial accounts and account type data related to one or more account types, wherein each account type is assigned a different subset of data fields from a set of data fields; and
a processor operable to:
receive transaction data in respect of a transaction initiated at an access terminal over the communications network from one of the access terminal and an access processing network, the access processing network comprising one or more computing platforms for processing transactions, the transaction data comprising a set of data fields;
identify a user account using the received transaction data, the user account being linked to a user with authority to release funds from the financial account;
identify an account type of the user account by parsing the user account data stored in the account database in respect of the identified user account;
determine, from the account database, a subset of data fields assigned to the identified account type;
select a subset of transaction data from the transaction data according to the determined subset of data fields;
generate an authorization request message with the selected subset of transaction data;
transmit the authorization request message to a mobile device identified by the user account, the authorization request message causing a display on the mobile device to prompt an access response from the user;
receive the access response from the user via the mobile device; and
transmit the access response to an the access processing network over the communications network, wherein the access response activates the access processing network to complete an authorization process in respect of the financial account to control access to the financial account based on the access response, wherein the authorization process involves:
a first-level authorization process determinative at least based on the transaction data, the access response activating the access processing network to conduct the first-level authorization process, the first-level authorization process involving:
operating the access processing network to obtain authorization for the transaction from a transaction processing institution associated with the financial account, the transaction processing institution determining whether to authorize the transaction using the transaction data; and
a second-level authorization process determinative based on the access response received from the mobile device, the second-level authorization process involving:
operating the access processing network to determine from the access response whether to grant access to the financial account; and
in response to determining that the access response grants access to the financial account, indicate the second-level authorization process grants access to the financial account.

11. The system of claim 10, wherein the access response activates the access processing network to:
in response to determining the access response grants access to the financial account, grant access to the financial account if the first-level authorization grants access to the financial account and if the first-level authorization denies access to the financial account, deny access to the financial account, otherwise, operate in accordance with the access response.

12. The system of claim 10, wherein the processor initiates a communication link with the access processing network for transmitting the access response in response to receiving the access response from the mobile device.

13. The system of claim 10, wherein:
the transaction data comprises an indicator file representing the user account for the user; and
the processor derives a user account identifier from the indicator file for identifying the user account.

14. The system of claim 10, wherein the processor:
derives a user account identifier of the user account by comparing at least a portion of the received transaction data with the stored user account data.

15. The system of claim 10, wherein the authorization request message comprises one or more of: an approval option for receiving a user input indicating the user has granted access to the financial account for completing the transaction, a denial option for receiving a user input indicating the user has denied access to the financial account for completing the transaction, an access lock option for receiving a user input indicating the user has blocked access to the financial account, and a contact option for receiving a user input triggering a communication link between the user and a financial institution providing the financial account.

16. The system of claim 10, wherein the access response comprises a biometric authentication input received from the user via the mobile device.

17. The method of claim 1, wherein the financial account comprises one of (i) a monetary valued account issued by a financial institution and (ii) a credit bureau account.

18. The method of claim 1, wherein the access terminal comprises one of a point-of-sale terminal, an Automated Teller Machine (ATM) terminal, a computer terminal, and a networked computing device.

19. The method of claim 1, wherein transmitting the authorization request message to the mobile device comprises:
operating the processor to transmit the authorization request via a push network, the push network acting as an open network connection between the mobile device and the financial account access system.

20. The method of claim 19, wherein the financial account access system comprises the push network.

21. The method of claim 1, wherein the account type comprises one of a personal consumer account type, a business manager account type, a merchant account type and a supplementary account type.

22. The method of claim 21, wherein, in response to determining the account type of the user account comprises the supplementary account type:
transmitting the authorization request message to the mobile device identified by the user account comprises:
transmitting a first authorization request message to a primary mobile device identified by a primary account of the user account; and
transmitting a second authorization request message to the mobile device identified by the user account; and
receiving the access response from the user comprises receiving a primary access response from the primary mobile device and a supplementary access response from the mobile device.

23. The method of claim 1, wherein identifying the user account at the financial account access computer server comprises:
operating the access terminal to identify the user account; and
transmitting an indicator file representing the user account to the financial account access computer server.

24. The method of claim 23, wherein the indicator file comprises a hash value representing a user account identifier of the user account.

25. The method of claim 1, wherein in response to the access processing network granting access to the financial account, the method comprises:
transmitting an access granted indicator to the transaction processing institution via the communications network, wherein the access granted indicator activates the transaction processing institution to release funds from the financial account.

26. The method of claim 1, wherein transmitting the access response to the access processing network over the communications network comprises:
receiving, at the financial account access computer server, the access response; and
operating the processor to transmit the access response to the access processing network.

27. The method of claim 1, wherein the access processing network is triggered to perform the second-level authorization process in response to the first-level authorization process granting access to the financial account.

28. The method of claim 1, wherein the transaction processing institution comprises one or more of an acquiring institution, a payment card network, and an issuing institution.

29. The system of claim 10, wherein the processor is operated to transmit the authorization request via a push network, the push network acting as an open network connection between the mobile device and the system.

30. The system of claim 29 further comprises the push network.

31. The system of claim 10, wherein the processor operates the access terminal to:
identify the user account; and
transmit an indicator file representing the user account to the system.

32. The system of claim 31, wherein the indicator file comprises a hash value representing a user account identifier of the user account.

33. The system of claim 10, wherein the transaction processing institution comprises one or more of an acquiring institution, a payment card network, and an issuing institution.

* * * * *

UNITED STATES PATENT AND TRADEMARK OFFICE
CERTIFICATE OF CORRECTION

PATENT NO. : 9,965,757 B2
APPLICATION NO. : 13/097255
DATED : May 8, 2018
INVENTOR(S) : Mick M. Bhinder Page 1 of 1

It is certified that error appears in the above-identified patent and that said Letters Patent is hereby corrected as shown below:

On the Title Page

Item (73):
"|Am| Authentications Inc., Richmond Hill (CA)"
Should read:
-- IAmI Authentications Inc., Richmond Hill (CA) --

In the Claims

Claim 1, Column 32, Line 33:
"transmits the access response to an the access processing"
Should read:
-- transmits the access response to the access processing --

Claim 10, Column 34, Line 13:
"transmit the access response to an the access processing"
Should read:
-- transmit the access response to the access processing --

Signed and Sealed this
Sixteenth Day of October, 2018

Andrei Iancu
*Director of the United States Patent and Trademark Office*